(12) United States Patent
Cohen et al.

(10) Patent No.: US 9,098,930 B2
(45) Date of Patent: Aug. 4, 2015

(54) STEREO-AWARE IMAGE EDITING

(71) Applicants: Scott D. Cohen, Sunnyvale, CA (US);
Brian L. Price, San Jose, CA (US);
Chenxi Zhang, Lexington, KY (US);
Jonathan W. Brandt, Santa Cruz, CA (US)

(72) Inventors: Scott D. Cohen, Sunnyvale, CA (US);
Brian L. Price, San Jose, CA (US);
Chenxi Zhang, Lexington, KY (US);
Jonathan W. Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 370 days.

(21) Appl. No.: 13/629,309

(22) Filed: Sep. 27, 2012

(65) Prior Publication Data

US 2013/0083021 A1    Apr. 4, 2013

Related U.S. Application Data

(60) Provisional application No. 61/542,038, filed on Sep. 30, 2011.

(51) Int. Cl.
*G06T 17/00* (2006.01)
*G06T 19/00* (2011.01)
*H04N 13/02* (2006.01)

(52) U.S. Cl.
CPC ............... *G06T 17/00* (2013.01); *G06T 19/00* (2013.01); *H04N 13/0246* (2013.01); *H04N 13/0271* (2013.01); *H04N 13/0275* (2013.01)

(58) Field of Classification Search
None
See application file for complete search history.

(56) References Cited

U.S. PATENT DOCUMENTS

| 6,249,285 | B1 * | 6/2001 | Madden et al. | 345/419 |
| 8,026,950 | B2 * | 9/2011 | Hill et al. | 348/218.1 |
| 2007/0296721 | A1 * | 12/2007 | Chang et al. | 345/427 |

OTHER PUBLICATIONS

P. F. Felzenszwalb and D. P. Huttenlocher. Efficient belief propagation for early vision. IJCV, 70, Oct. 2006. pp. 1-14.
V. Kolmogorov and R. Zabih. Computing visual correspondence with occlusions using graph cuts. In Computer Vision, 2001. ICCV 2001. Proceedings. Eighth IEEE International Conference on, vol. 2, pp. 508-515 vol. 2, 2001.
W.-Y. Lo, J. van Baar, C. Knaus, M. Zwicker, and M. Gross. Stereoscopic 3d copy & paste. In SIGGRAPH, pp. 147:1-147:10, 2010.
D. Scharstein and R. Szeliski. A taxonomy and evaluation of dense two-frame stereo correspondence algorithms. In IJCV, vol. 47, pp. 7-42, 2002.
C. Richardt, L. ' Swirski, I. Davies, and N. A. Dodgson. Predicting stereoscopic viewing comfort using a coherence-based computational model. In D. Cunningham and T. Isenberg, editors, Proceedings of Computational Aesthetics (CAe), Aug. 2011. pp. 1-8.

* cited by examiner

*Primary Examiner* — Edward Martello
(74) *Attorney, Agent, or Firm* — Wolfe-SBMC

(57) ABSTRACT

Embodiments of methods and systems for stereo-aware image editing are described. A three-dimensional model of a stereo scene is built from one or more input images. Camera parameters for the input images are computed. The three-dimensional model is modified. In some embodiments, the modifying the three-dimensional model includes modifying one or more of the images and applying results of the modifying one or more of the images to corresponding model vertices. The scene is re-rendered from the camera parameters to produce an edited stereo pair that is consistent with the three-dimensional model.

20 Claims, 22 Drawing Sheets

STEREO-AWARE IMAGE EDITING

CLAIM OF PRIORITY TO PROVISIONAL APPLICATION

This application claims benefit of priority of U.S. Provisional Application Ser. No. 61/542,038 entitled "Stereo-Aware Image Editing" filed Sep. 30, 2011, the content of which is incorporated by reference herein in its entirety.

DISCLOSURE OF GOVERNMENT SUPPORT AND LICENSE RIGHTS

This invention was made with government support under Prime Award #: 1019343, Subaward #: CIF-C-149, CFDA: 47.070 awarded by The National Science Foundation. The government has certain rights in the invention. This material is based upon work supported by the National Science Foundation under Grant #1019343 to the Computing Research Association for the CIFellows Project.

BACKGROUND

Description of the Related Art

The recent popularity of three-dimensional (3D) display systems as a vehicle for the display of professionally-produced motion pictures and video games has resulted in a significant increase in demand for the ability to produce three-dimensional images for display in a wide variety of market segments. Specifically, demand exists for image sets and tools usable to create the perception of depth, which is capable of being generated through the use of multiple views of the same scene. Methods of interacting with stereo image pairs are useful for handling the increasing amount of stereoscopic three-dimensional data now being produced.

Increasingly, that demand is serviced by cameras capable of natively producing stereoscopic image pairs through the use of multiple lenses spaced at a known distance. Likewise, stereoscopic images are sometimes captured from a single camera that is moved between image capture events.

In either case, the growing availability of multiple views of the same scene or objects has created demand for tools to enable users to consistently manipulate multiple images in order to create finished stereoscopic products.

SUMMARY

Embodiments of methods and systems for stereo-aware image editing are described. A three-dimensional model of a stereo scene is built from one or more input images. Camera parameters for the input images are computed. The three-dimensional model is modified. In some embodiments, the modifying the three-dimensional model includes modifying one or more of the images and applying results of the modifying one or more of the images to corresponding model vertices. The scene is re-rendered from the camera parameters to produce an edited stereo pair that is consistent with the three-dimensional model.

Figure 1:
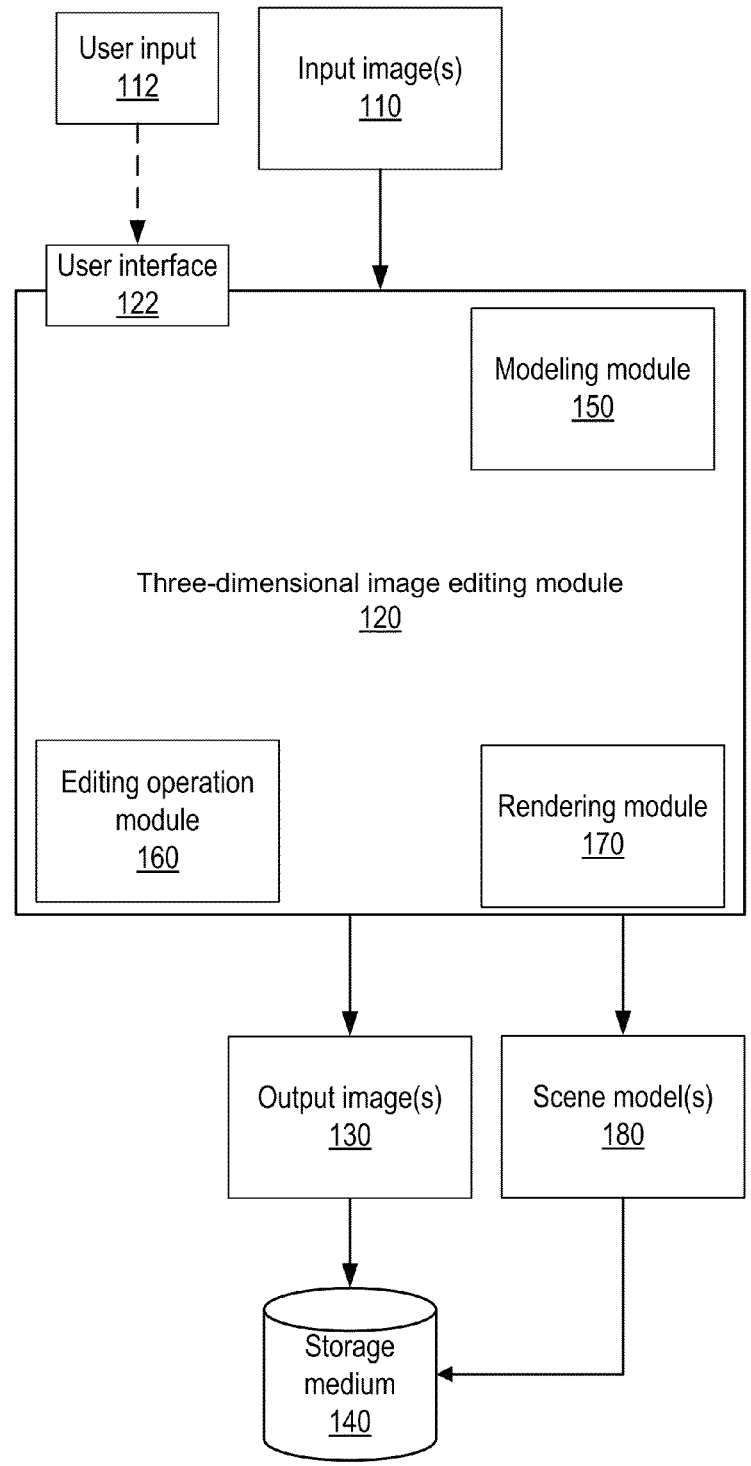
FIG. 1 illustrates a module that may implement three-dimensional modeling of stereo scenes for stereo aware image editing, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for stereo image editing using three-dimensional models are described below. Some embodiments may include tools for painting, cutting and pasting, or otherwise editing a stereo pair of three-dimensional images. For example, models of objects in the images may be developed, as described herein. Camera parameters may be computed. Editing may be performed in each of the images, and re-rendering of the images may be performed. A three-dimensional image editing module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input identifying a portion of a digital image of a stereo image pair to be edited, model development, camera parameter calculation, editing and re-rendering, as described herein. Other embodiments of the three-dimensional editing module may be at least partially implemented by hardware circuitry and/or firmware stored, for example, in a non-volatile memory.

Introduction to Editing Stereo Image Pairs

Some embodiments use one or more processors to perform building a three-dimensional model of a stereo scene from one or more input images, computing camera parameters for the input images, modifying the three-dimensional model and re-rendering the scene from the camera parameters to produce an edited stereo pair that is consistent with the three-dimensional model. In some embodiments, the modifying the three-dimensional model includes modifying one or more of the images and applying results of the modifying one or more of the images to the corresponding model vertices. In some embodiments, a model is a mathematical representation of a scene. A stereo scene is a scene viewed from two or more angles. A three dimensional model is a model having length, width and height. Vertices are points within the model where lines, such as edges intersect.

In some embodiments, the model includes a plurality of triangle meshes composed of vertices representing items in the scene, connected by a set of edges. In some embodiments, the building the three-dimensional model includes minimizing a measure of difference between a rendered left image and an input left image. Further, in some embodiments, the building the three-dimensional model includes minimizing a measure of difference between a rendered right image and an input right image. More specifically, in some embodiments, the building the three-dimensional model includes minimizing a sum of squared differences between a rendered left image and an input left image. In some embodiments, the building the three-dimensional model further includes minimizing a sum of squared differences between a rendered right image and an input right image. Likewise, in some embodiments, the building the three-dimensional model includes minimizing a sum of absolute differences between a rendered left image and an input left image. In some embodiments, the building the three-dimensional model further includes minimizing a sum of absolute differences between a rendered right image and an input right image. In some embodiments, the building the three-dimensional model further includes building an initial three-dimensional model from a stereo matching algorithm for the vertices and a structure from motion algorithm for the camera parameters and iteratively estimating the vertices, colors and camera parameters. In some embodiments, the building the three-dimensional model further includes moving points along a ray to the left camera center in order to improve the fidelity of the right image and moving points along a ray to the right camera center in order to improve the fidelity of the left image. In some embodiments, the building the three-dimensional model further includes numerically estimating a derivative of a fidelity term. In some embodiments, the modifying the three-dimensional model includes editing directly onto the one or more images without providing direct user interaction with the three dimensional model.

Some embodiments may include a means for stereo-aware image editing. For example, a three-dimensional image editing module may build a three-dimensional model of a stereo scene from one or more input images, compute camera parameters for the input images, modify the three-dimensional model, and re-render the scene from the camera parameters to produce an edited stereo pair that is consistent with the three-dimensional model, as described herein. In some embodiments, the three-dimensional image editing module may edit one or more of the images, applying results of the modifying one or more of the images to the corresponding model vertices, as described herein. The three-dimensional image editing module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform building a three-dimensional model of a stereo scene from one or more input images, computing camera parameters for the input images, modifying the three-dimensional model, and re-rendering the scene from the camera parameters to produce an edited stereo pair that is consistent with the three-dimensional model, as described herein. In some embodiments, the three-dimensional image editing module may edit one or more of the images, applying results of the modifying one or more of the images to the corresponding model vertices, as described herein. Other embodiments of the three-dimensional image editing module may be at least partially implemented by hardware circuitry and/or firmware stored, for example, in a non-volatile memory.

Some embodiments provide tools to enable a general strategy to improve consistency of stereo image editing for three-dimensional viewing. Some embodiments compute a three-dimensional model of the scene, modify the three-dimensional model either directly in three dimensions or through a two-dimensional image editing interface that applies the image edits to the three-dimensional model, and then re-render from the left and right cameras to obtain the edited images. Some embodiments support editing stereo image pairs in such a way as to create edited images that can be comfortably viewed on a stereoscopic three-dimensional display.

Some embodiments provide tools and methods to address the problem of stereo-aware copy-and-paste. Some embodiments create a somewhat consistently edited stereo pair for viewing by working with three-dimensional models instead of working in the two-dimensional image planes. First, some embodiments create a three-dimensional model for the source stereo pair from which the embodiments will copy. Some embodiments also create a three-dimensional model for the destination stereo pair into which the embodiments will paste.

In some examples, where the source and destination stereo pair are the same, some embodiments only need a single three-dimensional model. A two-dimensional image selection tool can be used to identify the pixels in an object that a user wants to copy from the source stereo pair. The corresponding three-dimensional geometry for the object is then identified and pasted into the three-dimensional model for the destination stereo pair. Subsequently, the left and right images are re-rendered after the new three-dimensional geometry has been pasted into the three-dimensional model for the destination stereo pair. In some embodiments, the result is a stereo pair that is consistent with the three-dimensional scene, with the correct depth ordering according to how the pasted three-dimensional geometry was situated within the destination three-dimensional model. In some embodiments, the stereo-aware editing strategy described herein avoids three-dimensionally inconsistent matching by formulating the matching problem in three-dimensions and building a three-dimensional model of the scene such that when the model is rendered to the left and right cameras it re-produces the left and right input stereo images. In some embodiments, such a three-dimensional model is then consistent with the input stereo pair.

In some embodiments, the challenge of optimizing a three-dimensional model that projects to the left and right input images is addressed with an iterative algorithm that alternates between modifying the three-dimensional model to improve the fidelity of the left rendered image to the left input image and then modifying the three-dimensional model to improve the fidelity of the right rendered image to the right input image. Some embodiments encourage convergence by decreasing the degree to which, when increasing the fidelity of the left rendered image, the embodiments decrease the fidelity of the right rendered image, and vice-versa. Some embodiments do this by adjusting model vertices, as described herein. When improving the fidelity of the left rendered image, some embodiments move vertices along rays to the right camera center. In this way, the right rendered image will not change after moving the vertices and its fidelity to the right input image remains the same. When improving the fidelity of the right rendered image, some embodiments move vertices along rays to the left camera center. In this way, the left rendered image will not change after moving the vertices and its fidelity to the left input image remains the same. Other vertex motions are used by some embodiments to further improve the three-dimensional model fidelity to the input stereo pair.

In some embodiments, three-dimensionally-consistent editing of stereo pairs is performed by computing a three-dimensional model of a stereo scene and the information describing the cameras that captured the stereo pair, modifying the three-dimensional model directly or indirectly by editing the two-dimensional images, and applying results of the modifying one or more of the images to the corresponding parts of the three-dimensional model, followed by re-rendering the scene from the left and right cameras to generate a three-dimensionally-consistent edited stereo pair. To execute the above strategy, some embodiments build a three-dimensional model for a stereo scene by optimizing over three-dimensional models such that projecting a three-dimensional model onto the left and right cameras reproduces the stereo input pair. Some embodiments apply the general strategy above for stereo-aware editing to the problem of creating a stereo-aware copy-and-paste tool on stereo input pairs. An area that a user wants to copy from a stereo pair corresponds to part of the three-dimensional scene model. Some embodiments extract that part of the three-dimensional scene model from the source stereo pair and paste it into the three-dimensional scene model for the destination stereo pair. Some embodiments allow various operations on the pasted model such as moving it in X, Y, and Z, and scaling it in three-dimensional space. The edited destination stereo pair is the result of rendering the modified scene model for the destination pair from the left and right cameras.

Some embodiments consistently edit stereo pairs of images for comfortable viewing on a stereoscopic three-dimensional display. Some embodiments compute a three-dimensional model of the scene, modify the three-dimensional model either directly in three-dimensions or though a usual two-dimensional image editing interface, and then re-render from the left and right cameras to obtain the edited images. Some embodiments provide a method for computing the three-dimensional model for a given scene from a stereo pair of images of that scene by allowing the rendered three-dimensional model to reproduce the input stereo images as closely as possible. Some embodiments use an algorithm and provide a user interface for copying and pasting between stereo image pairs. In some embodiments, the basic algorithm follows the general strategy above and computes three-dimensional scene models for both the source and destination stereo pairs.

In some embodiments, the three-dimensional model for the object to be copied from the source pair is pasted into the three-dimensional scene model for the destination pair. The user can transform and position the source object within the destination scene. The edited images are the rendered versions of the modified destination scene. The transformation and positioning of the pasted image can be done with a traditional two-dimensional user interface, and, in some embodiments, the user never needs to see (or is never shown) the three-dimensional representation. In some embodiments, the two-dimensional position of the pasted object can be adjusted by moving the mouse, its depth can be adjusted by using the scroll wheel on the mouse to move the object closer to or more distant from the camera, and its global scale can also be adjusted using the scroll wheel when a modifier key is pressed. In some embodiments, the model further comprises a mapping between a pixel-color for each vertex.

In some embodiments, a stereo image pair is rectified. Stereo matching is performed to compute quantized disparities. Camera parameters are computed, and the depth Z and disparity D for a pixel are related as a function, where $Z=Tf/D$. In some embodiments, a translation vector is calculated such that T is the translation vector between the cameras of the rectified pairs and f is the focal length of the cameras. In some embodiments, the camera parameters are the position and orientation differences between them (translation and rotation). Other camera parameters can include the mapping between real world coordinates and pixels, including focal length and center of projection.

Example Implementations

FIG. 1 illustrates a three-dimensional image editing module that may implement one or more of the three-dimensional editing techniques and tools illustrated in FIGS. 2 through 22. For example, three-dimensional image editing module 120 may develop models, such as scene models 180, of objects in input images 119, as described herein. Camera parameters may be computed by three-dimensional image editing module 120. Editing may be performed in each of the input images 110, and re-rendering of the images may be performed by three-dimensional image editing module 120 to generate output images 130. FIG. 23 illustrates an example computer system on which embodiments of module 120 may be implemented. Three-dimensional image editing module 120 may, for example, implement one or more of tools for editing operations including painting, cutting and pasting, or otherwise editing a stereo pair of three-dimensional images, as described herein.

Figures 9A, 9B:
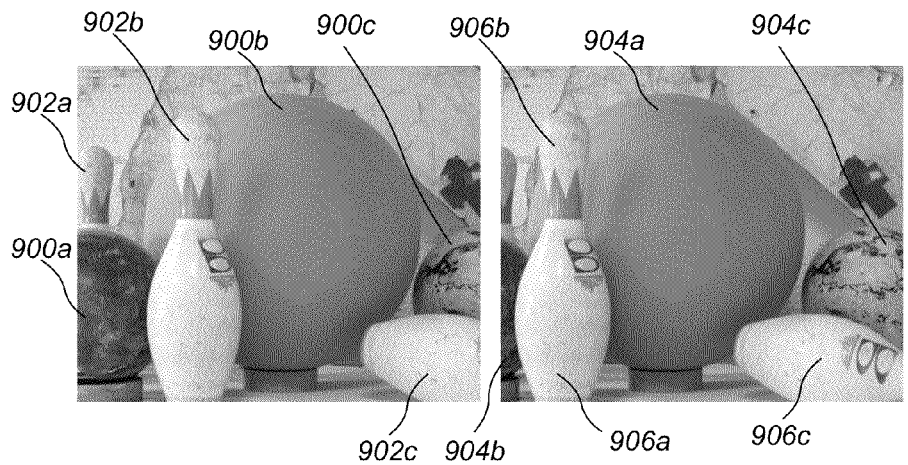
FIG. 9A illustrates a left image in a stereo input pair of images, according to some embodiments.
FIG. 9B depicts a right image in a stereo input pair of images, according to some embodiments.

Three-dimensional image editing module 120 receives as input two or more digital images 110. An example image pair is shown in FIG. 9A-9B. Three-dimensional image editing module 120 may receive user input 112 activating a three-dimensional stereo image pair editing tool. Three-dimensional image editing module 120 then edits the input image(s) 110, according to user input 112 received via user interface 122, using the activated stereo aware image pair editing tool. The user may activate a different stereo aware image pair editing tool and further edit the images, and/or may activate other tools and further edit the images. Three-dimensional image editing module 120 generates as output one or more modified images 130. Output image(s) 130 may, for example, be stored to a storage medium 140, such as system memory, a disk drive, DVD, CD, etc.

In some embodiments, three-dimensional image editing module 120 may provide a user interface 122 via which a user may interact with the three-dimensional image editing module 120, for example to activate a stereo-aware image editing tool, to perform a stereo-aware editing gesture, and to perform a stereo-aware editing method as described herein. In some embodiments, the user interface may provide user interface elements whereby the user may select options.

Modeling module 150 performs building a three-dimensional model (scene model 180) of a stereo scene from one or more input images 110 and computing camera parameters for the one or more input images 110. In some embodiments, scene model 180 includes a set of triangle meshes composed of vertices representing items in the scene connected by a set of edges. In some embodiments, modeling module 150 performs building an initial three-dimensional model from a stereo matching algorithm for the vertices and a structure from motion algorithm for the camera parameters and iteratively estimating the vertices, colors and camera parameters. In some embodiments, modeling module 150 performs moving points along a ray to the left camera center in order to improve the fidelity of the right image, and moving points along a ray to the right camera center in order to improve the fidelity of the left image. In some embodiments, modeling module 150 performs numerically estimating a derivative of a fidelity term.

Editing operation module 160 performs modifying the three-dimensional model. In some embodiments, editing operation module 160 performs editing one or more of the input images 110 and applying results of the modifying one or more of the images to the corresponding model vertices of scene models 180. In some embodiments, editing operation module 160 allows modifying the three-dimensional models of scene model(s) 180 by editing directly onto the one or more input images 110 without providing direct user interaction with the three-dimensional models of scene model(s) 180.

Rendering module 170 performs re-rendering the scene from the camera parameters to produce an edited stereo pair of output images 140 that is consistent with the three-dimensional model. In some embodiments, rendering module 170 performs minimizing a measure of differences (e.g., such as a sum of absolute differences or a sum of squared differences) between a rendered left image of output images 130 and an input left image. In some embodiments, rendering module 170 performs minimizing a measure of differences (e.g., such as a sum of absolute differences or a sum of squared differences) between a rendered right image of output images 130 and an input right image.

Modeling Stereo Scenes

Some embodiments represent a scene as a set of triangle meshes with colors at vertices representing the three-dimensional geometry and texture of objects in the scene. Allowing more than one triangle mesh enables embodiments to forgo connections between a foreground object and the background where there is a depth discontinuity. For example, the three-dimensional model of the bowling scene in FIG. 9A-9E, discussed below, would contain separate triangle meshes for the two pins, the two bowling balls, and the background. In describing embodiments below, the set of triangle meshes is described as a graph (V, E), where $V \subset R^3$ is a set of vertices and $E \subseteq V \times V$ is a set of edges. In describing embodiments below, we let T denote the mapping that assigns a color to each vertex in V. The camera parameters, both internal and external, for the left and right views are denoted by $C_L$ and $C_R$. Given the three-dimensional geometry (V, E) and texture T for the scene, and the left camera information $C_L$, embodiments render an image of the scene from the left camera. As used herein, we denote the left rendered image as $\tilde{I}_L$ (V,E,T,$C_L$). Similarly, we denote the right rendered image as $\tilde{I}_R$ (V,E,T,$C_R$). Some embodiments build a dense three-dimensional model of a scene from a stereo pair of input images, including the computation of the camera locations, poses, and internal parameters. In some embodiments, the computed three-dimensional scene model (three-dimensional geometry and texture) is such that imaging the scene from the two computed cameras reproduces the input images closely. Let $I_L$ and $I_R$ denote the left input and right stereo images. Some embodiments use an objective function described as S(V,E,T,$C_L$,$C_R$)=D $\tilde{I}_L$ (V,E,T,$C_L$),$I_L$)+D $\tilde{I}_R$ (V,E,T,$C_R$),$I_R$)+ G(V,E,T).

In that objective function, the first term measures the difference between the left rendered image and the left input image. The second term measures the difference between the right rendered image and the right input image. The final term regularizes the problem and incorporates a probabilistic prior on three-dimensional scene geometry. It may include a prior on the complexity of the scene description as measured by the number of depth discontinuities in the scene (such a term would depend on the set of edges E as leaving out edges between vertices corresponding to neighboring locations in the image grid indicates a depth discontinuity).

One possible implementation is $$D(\tilde{I}_L(V, E, T, C_L), I_L) = \sum_p \|\tilde{I}_L(V, E, T, C_L)[p] - I_L[p]\|_2^2,$$

$$D(\tilde{I}_R(V, E, T, C_R), I_R) = \sum_p \|\tilde{I}_R(V, E, T, C_R)[p] - I_R[p]\|_2^2,$$

$$G(V, E, T) = \sum_{(V_i, V_j) \in E} \rho_{ij}(V_i, V_j), \text{ and}$$

$$\rho_{ij}(V_i, V_j) = \lambda_{ij} \|V_i - V_j\|_2^2.$$

As used herein, the image difference D is measured by summing the squared $L_2$ distance between pixel color vectors (e.g., 3 vectors of [R, G, B]) over all pixels p. Alternative embodiments support other measures of image difference, for example summing the $L_1$ distance between pixel color vectors or a truncated color distance for robustness to outliers.

The scene description prior term G given above is a simple smoothness prior on the three-dimensional scene geometry, which sums the squared $L_2$ distance in $R^3$ between mesh vertices that are connected by an edge. In one implementation, $\lambda_{ij} = \lambda$, a single factor that trades off the importance of geometric smoothness with fidelity to the input images from the first two terms. Other implementations of G(V; E; T) could use a different vertex difference measure $\rho_{ij}(V_i; V_j)$, such as Euclidean distance between vertices instead of distance squared, or a robust error function that does not penalize large vertex distances excessively. Other embodiments encourage smoothness on surface normals instead of vertex positions.

Some embodiments employ a robust smoothness measure on surface normals to preserve creases in the three-dimensional geometry, such as where two walls meet at a right angle. The specific G implementation given above does not penalize scene description complexity. If E were empty, then the above proposed final term G(V, E, T) would yield a zero cost, but the lack of correct connections between vertices would have a negative impact on how well the rendered images would match the input stereo pair of images because rays from the image centers of projection would miss the disconnected scene geometry instead of hitting the correct triangle in a mesh.

Nonetheless, some embodiments include an explicit term for a scene complexity prior, for example preferring a smaller number of mesh connected components. Some embodiments additionally penalize small distances between $V_i$ and $V_j$ when $V_i$ and $V_j$ correspond to neighboring pixels on the image grid but $(V_i, V_j) \notin E$. In this situation, the lack of an edge in E is an indication of depth discontinuity and so one would expect a relatively large distance between the two three-dimensional vertices $V_i$ and $V_j$ that project to nearby locations on the left and right images.

Some embodiments address the three-dimensional scene modeling task, by minimizing the objective function S over the scene geometry, texture, and camera parameters:

$$(V^*, E^*, T^*, C_L^*, C_R^*) = \arg\min_{(V, E, T, C_L, C_R)} S(V, E, T, C_L, C_R). \quad (1)$$

In some embodiments, one strategy for minimizing the objective function is to successively minimize S(V,E,T,$C_L$, $C_R$) for each of the inputs while holding the other inputs constant at their current estimate. Some embodiments run a stereo matching algorithm such as the hierarchical belief propagation algorithm to obtain an approximate set of dense correspondences. These correspondences in combination with the input images and initial left and right camera parameters $C_L$ and $C_R$ are be used to initialize the scene description (V, E, T). Some embodiments detect depth discontinuities in the initial stereo matching results in order to initialize the set of edges E and create separate triangle meshes for different objects.

In some embodiments, instead of using the results of a stereo matching algorithm, the three-dimensional geometry and topology can also be initialized using the output of a depth camera which provides per-pixel depth estimates. The depth maps obtained from depth cameras may also benefit from further refinement when building high quality three-dimensional models. Depth cameras typically provide a regular RGB image along with the depth map, and thus the three-dimensional texture can also be initialized from the depth camera output. Some embodiments use a Structure-from-Motion (SFM) algorithm to obtain an initial estimate the camera parameters $C_L$ and $C_R$ for the left and right cameras.

Given (estimates for) E, T, $C_L$ and $C_R$, embodiments employ an algorithm for finding the optimal vertex geometry V*. Some embodiments employ a gradient descent algorithm that works as follows. At each iteration, some embodiments move vertices so as to decrease the cost S. For example, some embodiments move vertices in order to make the left rendered image $\tilde{I}_L$ closer to the input image $I_L$, i.e., to decrease D $\tilde{I}_L$(V,E,T,$C_L$),$I_L$). Such moves sometimes take the right rendered image $\tilde{I}_R$ farther from the right input image $I_R$, i.e., increase D $\tilde{I}_R$(V,E,T,$C_R$),$I_R$) and possibly increase the total cost S. Thus some embodiments employ an alternating scheme in which vertices are first moved so as to decrease the sum D $\tilde{I}_L$(V,E,T,$C_L$),$I_L$)+G(V,E,T) but keep D $\tilde{I}_R$(V,E,T,$C_R$),$I_R$) constant. This results in a decrease in the total cost S. Such embodiments keep D $\tilde{I}_R$(V,E,T,$C_R$),$I_R$) constant by moving each vertex $V_i$ along the ray from the right camera center $O_R$ to $V_i$. By moving the vertices along these rays to the right camera center, the right rendered image remains the same, because the vertices will project to the same points on the right image plane as before the movement. The second step of the alternation is to move vertices $V_i$ along the ray from the left camera center $O_L$ to $V_i$ in such a way as to decrease D $\tilde{I}_R$(V,E,T,$C_R$),$I_R$)+G(V,E,T).

Moving vertices along the rays to the left camera center leaves the left rendered image $\tilde{I}_L$ and image difference D $\tilde{I}_L$(V,E,T,$C_L$),$I_L$) constant, and thus decreases the total cost S. The alternation goes back and forth between such vertex motions until convergence, alternately improving the fidelity of the left rendered image to the left input image and improving the fidelity of the right rendered image to the right input image. See FIGS. 2-3B for an illustration of the vertex motions in the alternating scheme.

Figure 2:
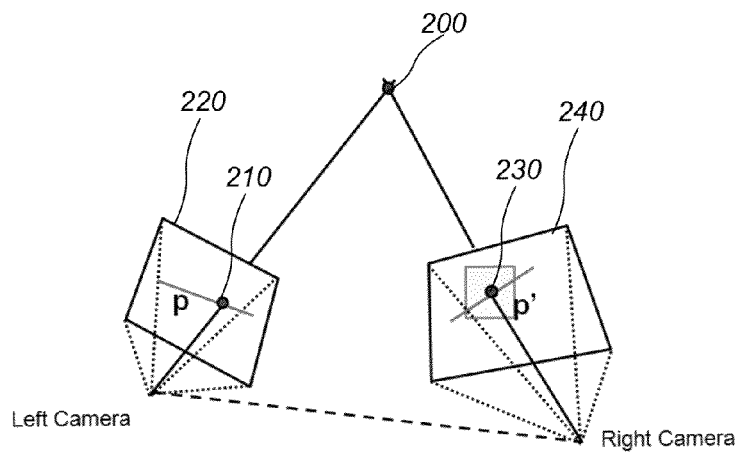
FIG. 2 depicts vertex motions, according to some embodiments.

FIG. 2 depicts vertex motions, according to some embodiments. In modeling a position of a pixel 200, a 3D model vertex projects onto p 210 in the left image 220 and p' 230 in the right image 240.

Figure 3A:
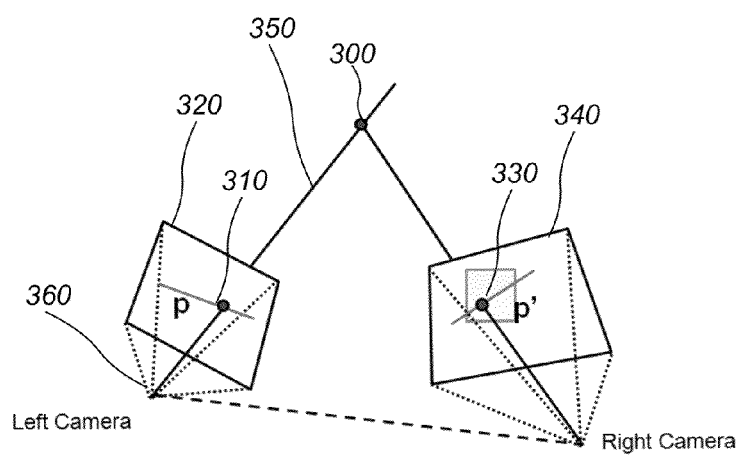
FIG. 3A illustrates vertex motions, according to some embodiments.

FIG. 3A illustrates vertex motions, according to some embodiments. In modeling a position of a pixel 300, a 3D model vertex projects onto p 310 in the left image 320 and p' 330 in the right image 340. The vertex is moved along the ray 350 to the left camera center 360. This movement does not change the projection of the point p 310 onto the left image 320. Such small vertex motions leave the rendered left image constant, but allow for improving the fidelity of the right rendered image.

Figure 3B:
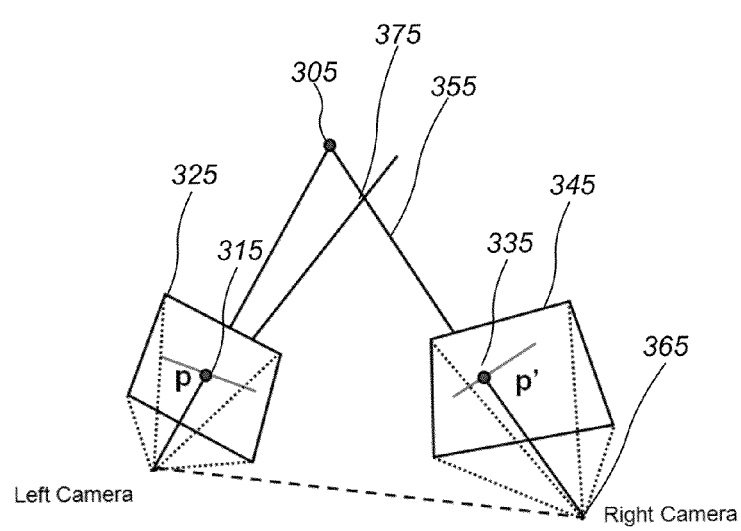
FIG. 3B depicts vertex motions, according to some embodiments.

FIG. 3B depicts vertex motions, according to some embodiments. In modeling a position of a pixel 305, a 3D model vertex projects onto p 315 in the left image 325 and p' 335 in the right image 345. The vertex is moved along the ray 355 to intersection toward the right camera center 365. This movement not change the projection of the point p' onto the right image. Such vertex motions leave the rendered right image constant, but allow for improving the fidelity of the left rendered image. FIG. 2 and FIG. 3A show that a small motion of a vertex typically affects only a local area of the rendered image.

When improving the fidelity of the left rendered image, some embodiments move the three-dimensional model vertices along the rays to the right camera center:

$$V_i := V_i + \alpha_i \frac{(O_R - V_i)}{\|O_R - V_i\|} = V_i + \alpha_i U_i^R. \quad (2)$$

The unknowns here are the distances $\alpha_i$ to move each vertex $V_i$ toward or away from the right camera center. Embodiments iteratively improve the vertices V using gradient descent optimization with update step $$\alpha_i^{(n+1)} = \alpha_i^{(n)} - \tau \frac{\partial F^R}{\partial \alpha_i}, \quad (3)$$

where $\tau$ is the step size, $F^R(\alpha_1, \alpha_2, \ldots, \alpha_N)$=S($V_1+\alpha_1 U_1^R, \ldots, V_N+\alpha_N U_N^R$,E,T,$C_L$, $C_R$), and the three-dimensional model contains N vertices.

An analogous update step is used in the next alternating step to improve the fidelity of the right rendered image by moving along the rays to the left camera center:

$$V_i := V_i + \beta_i \frac{(O_L - V_i)}{\|O_L - V_i\|} = V_i + \beta_i U_i^L \quad (4)$$

and $$\beta_i^{(n+1)} = \beta_i^{(n)} - \tau \frac{\partial F^L}{\partial \beta_i}, \quad (5)$$

where $F^L(\beta_1, \beta_2, \ldots, \beta_N) = S(V_1 + \beta_1 U_1^L, \ldots, V_N + \beta_N U_N^L, E, T, C_L, C_R)$.

Some embodiments support either or both of two implementations of an alternating scheme to reach the best vertex geometry V* given E, T, $C_L$ and $C_R$. One implementation improves first the fidelity of the left rendered image as much as possible by running gradient descent (3) to convergence to find the optimal ($\alpha_1, \ldots, \alpha_N$) and thus by (2) a new set of vertices V. Such an implementation then improves the fidelity of the right rendered image as much as possible by running gradient descent (5) to convergence to find the optimal ($\beta_1, \ldots, \beta_N$) and thus by (4) a new set of vertices V.

An additional implementation alternates between one update step (3) to update V and one update step (5) to update V. Such an implementation alternates between making a small improvement to the left rendered image and a small improvement to the right rendered image. These single steps start from $\alpha_i^{(0)} \equiv 0$ and $\beta_i^{(0)} \equiv 0$ because the set of vertices V is re-computed via (2) and (4) before the next gradient descent step.

Figure 4:
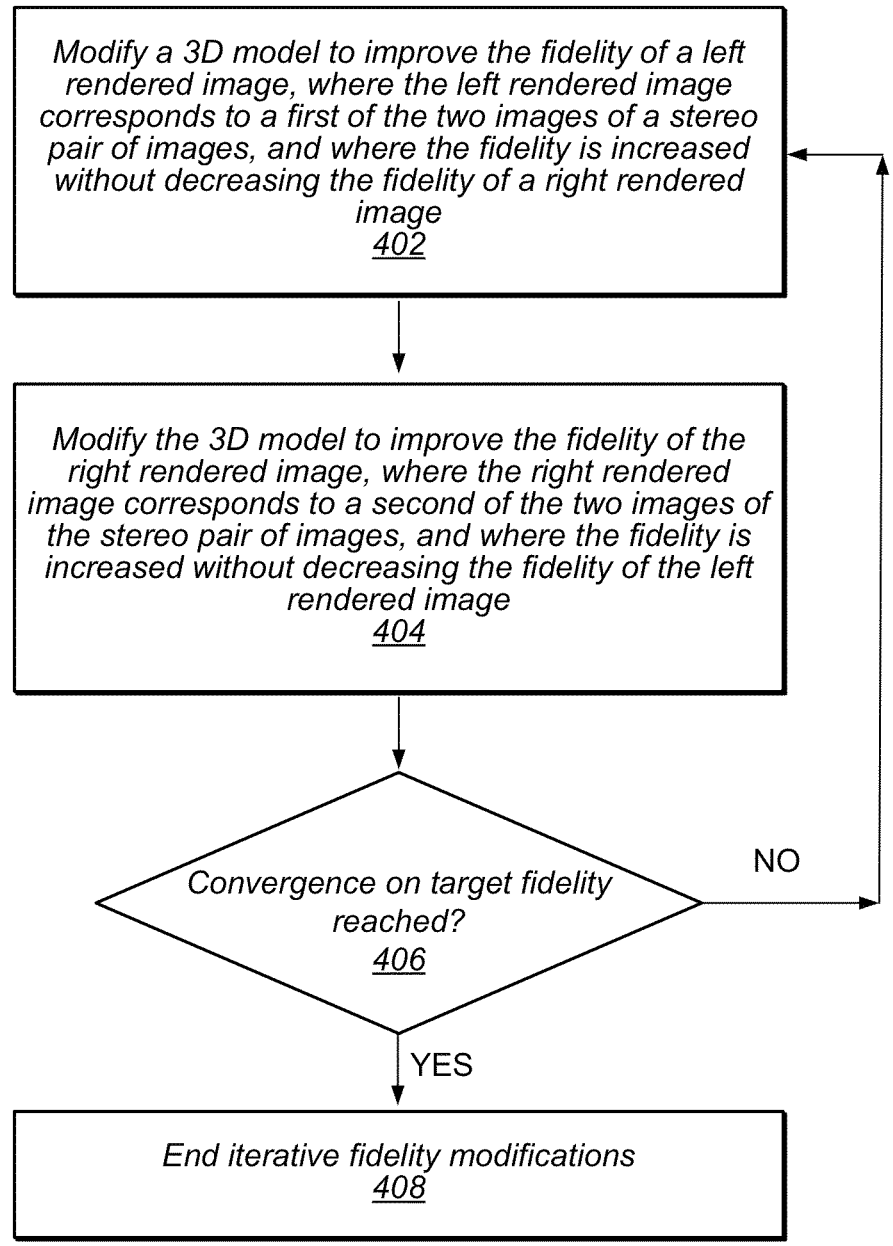
FIG. 4 is a flowchart of an embodiment of modifying a three-dimensional model to improve the fidelity of corresponding stereo images.

FIG. 4 is a flowchart of an embodiment of modifying a three-dimensional model to improve the fidelity of corresponding stereo images. A three-dimensional model is modified to improve the fidelity of a left rendered image, where the left rendered image corresponds to a first of the two images of a stereo pair of images, and where the fidelity is increased without decreasing the fidelity of a right rendered image (block 402). The 3D model is modified to improve the fidelity of the right rendered image, where the right rendered image corresponds to a second of the two images of the stereo pair of images, and where the fidelity is increased without decreasing the fidelity of the left rendered image (block 404).

A determination is made as to whether convergence on target fidelity has been reached (block 406). If convergence on target fidelity has not been reached, then the process returns to block 402, which is described above. If convergence on target fidelity has been reached, then iterative modifications are ended (block 408).

Figure 5:
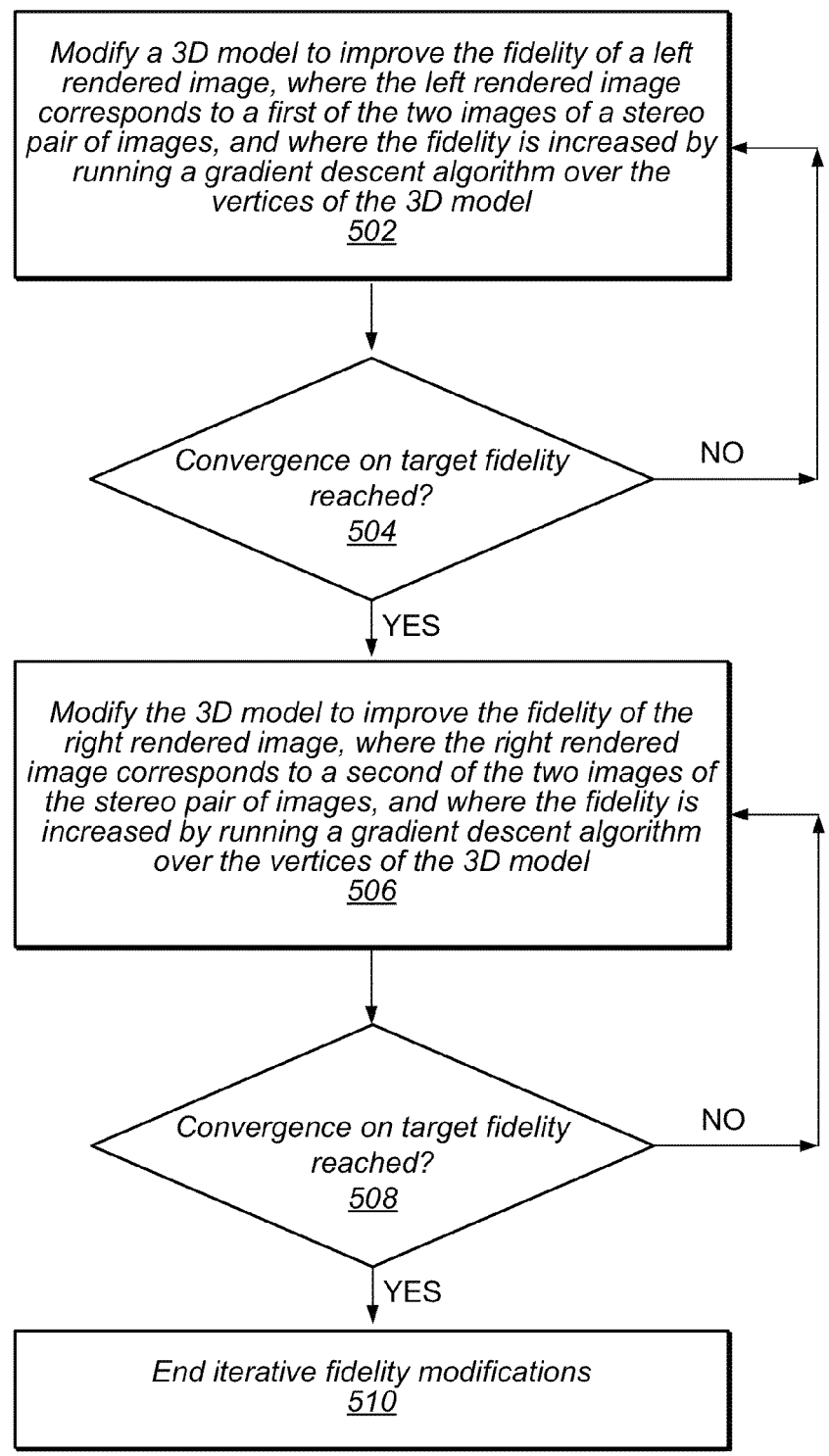
FIG. 5 is a flowchart of an embodiment of modifying a three-dimensional model to improve the fidelity of corresponding stereo images.

FIG. 5 is a flowchart of an embodiment of modifying a three-dimensional model to improve the fidelity of corresponding stereo images. A three-dimensional model is modified to improve the fidelity of a left rendered image, where the left rendered image corresponds to a first of the two images of a stereo pair of images, and where the fidelity is increased by running a gradient descent algorithm over the vertices of the three-dimensional model (block 502). In some embodiments, other optimizations are used in place of gradient descent.

A determination is made as to whether convergence on target fidelity has been reached (block 504). If convergence on target fidelity has not been reached, then the process returns to block 502, which is described above. If convergence on target fidelity has been reached, then the three-dimensional model is modified to improve the fidelity of the right rendered image, where the right rendered image corresponds to a second of the two images of the stereo pair of images, and where the fidelity is increased by running a gradient descent algorithm over the vertices of the three-dimensional model (block 506). A determination is made as to whether convergence on target fidelity has been reached (block 508). If convergence on target fidelity has not been reached, then the process returns to block 506, which is described above. If convergence on target fidelity has been reached, then iterative modifications end (block 510).

Some embodiments also feature a fast method for computing the needed partial derivatives $\partial F^R/\partial \alpha_i$ and $\partial F^L/\partial \beta_\in$ in (3) and (5), respectively. In some embodiments, these derivatives are computed by differentiating $D\tilde{I}_L(V,E,T,C_L),I_L)$, $D\tilde{I}_R(V,E,T,C_R),I_R)$ and $G(V,E,T)$. Using $V(\alpha)$ as a shorthand for the new locations of the vertices in (2), with $\alpha=(\alpha_1, \ldots, \alpha_N)$, embodiments find the partials of $G(V(\alpha),E,T)$ with respect to the $\alpha_i$ analytically, at least for the geometric smoothness in some implementations. In some embodiments, the partial derivatives $\partial D\tilde{I}_L(V(\alpha),E,T,C_L),I_L)/\partial \alpha_i$ are not computed analytically.

Some embodiments employ the following efficient method for numerically estimating the needed partial derivatives of the fidelity terms:

$$\frac{\partial D(\tilde{I}_L(V(\alpha), E, T, C_L), I_L)}{\partial \alpha_i} =$$

$$[D(\tilde{I}_L(V(\alpha_1, \ldots, \alpha_{i-1}, \alpha_i + \epsilon, \alpha_{i+1}, \ldots, \alpha_N)), I_L) - D(\tilde{I}_L(V(\alpha)), I_L)]/\epsilon$$

for a small value of $\in$. As described above, the dependence on the fixed parameters E, T, $C_L$ and $C_R$ is dropped for simplicity. Both terms in the numerator employ rendering the scene geometry specified by the parameters $\alpha$ and $\in$. Whenever a rendering of scene geometry is called for, some embodiments perform the rendering using the GPU (graphics processing unit). In some embodiments, the second term $D(\tilde{I}_L(V(\alpha)),I_L)$ is evaluated just once when computing all the $\partial F^R/\partial \alpha_i$ at evaluated at the current $\alpha=(\alpha_1, \ldots, \alpha_N)$. The first term starts with the vertex configuration $V(\alpha)$, moves a single vertex $V_i$ according to $\in$, re-renders the geometry after moving $V_i$, and then computes the image difference between $\tilde{I}_L(V(\alpha_1, \ldots, \alpha_{i-1}, \alpha_i+\in, \alpha_{i+1}, \ldots, \alpha_N))$ and $I_L$. This is repeated for each vertex $V_i$. In some embodiments, the speed of the above computation can be greatly increased as follows. For each gradient descent update of the vertex set V, some embodiments perform N+1 renderings to the left image camera for vertex configurations $V(\alpha)$ and $V(\alpha_1, \ldots, \alpha_{i-1}, \alpha_i+\in, \alpha_{i+1}, \ldots, \alpha_N)$ for $i=1, \ldots, N$.

In some embodiments, differences in the left rendered image $\tilde{I}_L$ before and after moving a single vertex $V_i$ by a small amount will occur only in a local area around the projection of $V_i$ onto the left image plane. Thus when moving vertex $V_i$, embodiments only render a local area around the projection of $V_i$ by rendering only a local area of the triangle meshes around $V_i$. Some embodiments then only compare this local area to the same area in $I_L$ when estimating $\partial F^R/\partial \alpha_i$ instead of comparing the entire images. In some embodiments, this means computing the sum of squared color differences over only a small portion of the rendered and input images instead of over the entire images. Of course, in some embodiments, the same optimizations are performed when estimating the partials $\partial F^L/\partial \beta_i$.

Some embodiments extend this gradient descent algorithm to optimize over the camera parameters $C_L$ and $C_R$ as well as the vertices V. The term $G(V,E,T)$ specifying a prior on the three-dimensional scene does not depend on the camera parameters. Only the model fidelity terms with respect to the input images depend on the camera parameters. The partial derivative of our cost function with respect to, for example, the focal length f of the cameras is $$\frac{\partial S(V, E, T, C_R, C_L)}{\partial f} =$$

$$\frac{\partial D(\tilde{I}_L(V, E, T, C_L), I_L)}{\partial f} + \frac{\partial D(\tilde{I}_R(V, E, T, C_R), I_R)}{\partial f}.$$

As in the case of updating the model vertices, some embodiments can numerically compute the partial derivatives of our cost function S with respect to camera parameters by slightly adjusting each of the camera parameters, re-rendering the left and right images with the new camera parameters, and then measuring the difference of the re-rendered images and the input images. For the focal length camera parameter, some embodiments can estimate the partial derivative as $$\frac{\partial D(I_L(V, E, T, C_L), I_L)}{\partial f} =$$
$$[D(\widehat{I_L}(C_L = (f + \delta f, \ldots)), I_L) - D(\widehat{I_L}(C_L = (f, \ldots)), I_L)]/\delta,$$

where the dependence on the fixed parameters (V,E,T,$C_R$) has been dropped for simplicity.

In some embodiments, small changes to a camera parameter can create a global change to the rendered image. Thus, when computing the partial cost derivatives with respect to camera parameters, some embodiments render the entire image and compare the entire rendered image to entire input image. Although some embodiments do not apply approximation of rendering only parts of the image as when adjusting vertices, the overall running time of the gradient descent to solve for the best (V, $C_L$, $C_R$) is frequently not much longer than solving just for the best V. In some embodiments, this is because there are only a handful of camera parameters: the translation vector between the left and right cameras, the relative three-dimensional rotation matrix between the left and right cameras, the focal length of the cameras, and the centers of projection of the images. In some embodiments, incorporating the camera parameters only requires a constant number of additional renderings per gradient descent step.

Some embodiments move several vertices around a vertex $V_i$ when evaluating the partial cost derivative with respect to $V_i$. If moving a vertex toward the right camera center helps improve model fidelity, then it is likely that similar movements of nearby vertices will further improve the fidelity. It may also be the case that gains in local fidelity may not be easily identified by moving one vertex at a time. Thus moving several nearby vertices may speed up convergence and help the embodiment avoid local minima. If $V_i$ is moved by an amount a along the ray to the right camera center, then its neighboring vertices can also be moved on rays to the right camera center, perhaps by an amount that decreases with increasing distance to $V_i$.

Achieving Stereoscopic Three-Dimensional-Consistent Image Editing Operations on Stereo Image Pairs Some embodiments seek to achieve stereoscopic three-dimensional-consistent image editing operations on stereo image pairs in a process of:
  building a three-dimensional model (geometry and texture) of a stereo scene and computing the camera location, pose, and internal parameters (focal length and center of projection) for the input images;
  modifying the three-dimensional model directly or indirectly through editing the images and then applying results of the modifying one or more of the images to the corresponding model vertices; and
  re-rendering the scene from the known cameras to produce an edited stereo pair which is consistent in three-dimensions.

Some embodiments also adjust the external or internal camera parameters to generate a new stereo pair. For example, some embodiments move the cameras to generate intermediate views for creating lenticular prints or for driving a glasses-free stereoscopic three-dimensional monitor that requires more than 2 views (e.g. Alioscopy makes glasses-free display that uses 8 views). After moving a camera, a new part of the scene becomes visible that was not visible in the original left and right views and hole filling is provided by some embodiments.

Figure 6:
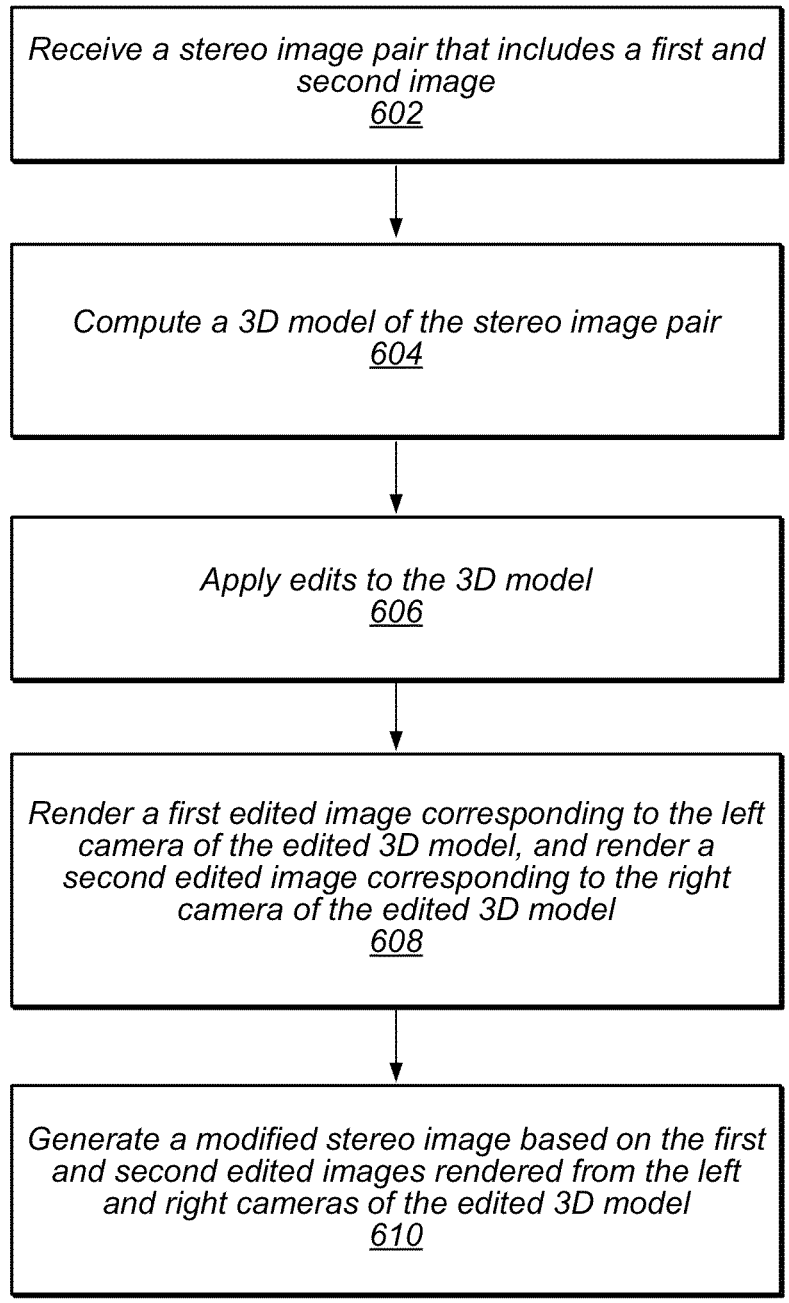
FIG. 6 is a flowchart of an embodiment of three-dimensional modeling of stereo scenes for stereo aware image editing.

FIG. 6 is a flowchart of an embodiment of three-dimensional modeling of stereo scenes for stereo aware image editing. A stereo image pair that includes a first image and a second image is received (block 602). A three-dimensional model of the stereo image pair is computed (block 604). Edits are applied to a three-dimensional model (block 606). A first edited image corresponding to the left camera of the edited three-dimensional model, and a second edited image corresponding to the right camera of the edited three-dimensional model are rendered (block 608). A modified stereo image pair is generated based on the first and second edited images rendered from the left and right cameras of the edited three-dimensional model (block 610).

Figure 7:
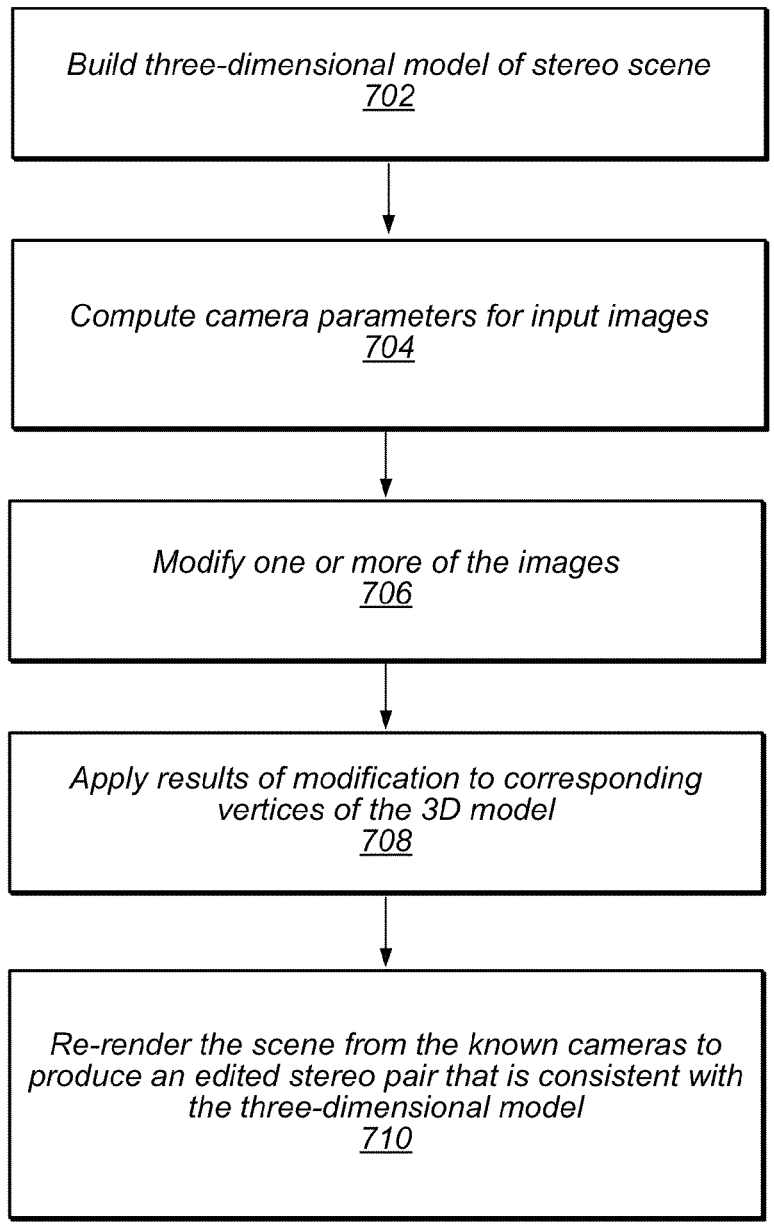
FIG. 7 is a flowchart of an embodiment of three-dimensional modeling of stereo scenes for stereo aware image editing.

FIG. 7 is a flowchart of an embodiment of three-dimensional modeling of stereo scenes for stereo aware image editing. A three dimensional model of a stereo scene is built (block 702). Camera parameters for input images are calculated (block 704). One or more of the images is modified (block 706). The modifications are applied to corresponding vertices of the three-dimensional model (block 708). The scene is re-rendered from the camera parameters to produce an edited stereo pair that is consistent with the three-dimensional model (block 710).

Building a Dense Three-Dimensional Model of a Stereo Scene

Some embodiments build a dense three-dimensional model of a stereo scene by optimizing a function of three-dimensional geometry and texture such that rendering the three-dimensional geometry and texture from known cameras reproduces the stereo input images as closely as possible. Many embodiments build a stereo scene from multiple images. Some embodiments, however, build a three dimensional model of a stereo scene from a single image data structure, such as results from the application of a light-field camera or a plenoptic camera, by extracting depth information or angular information from multiple lens results and synthesizing images from multiple viewpoints or depth maps from the plenoptic image. A prior on three-dimensional scenes is incorporated into the objective function to regularize the problem. By projecting the three-dimensional model onto the left and right image planes, correspondences between the image planes are established and occlusions may be determined.

Some embodiments:
  rectify the stereo image pair so that the cameras image planes are parallel and scanlines in the left image correspond to scanlines in the right image;
  perform stereo matching to compute quantized disparities D (if location ($x_L$, y) in the left image matches location ($x_R$, y) in the right image, then the disparity at ($x_L$, y) is the offset D=$x_L$−$x_R$),
  compute the cameras,
  relate depth Z and disparity D for a pixel are Z=Tf/D, where T is the translation vector between the cameras of the rectified pairs and f is the focal length of the cameras.

Some embodiments generate as output a set of triangle meshes where triangle meshes are not connected across depth discontinuities. Some embodiments perform image-based modeling of a stereo pair of images and output a dense three-dimensional model of triangle meshes.

Figure 8:
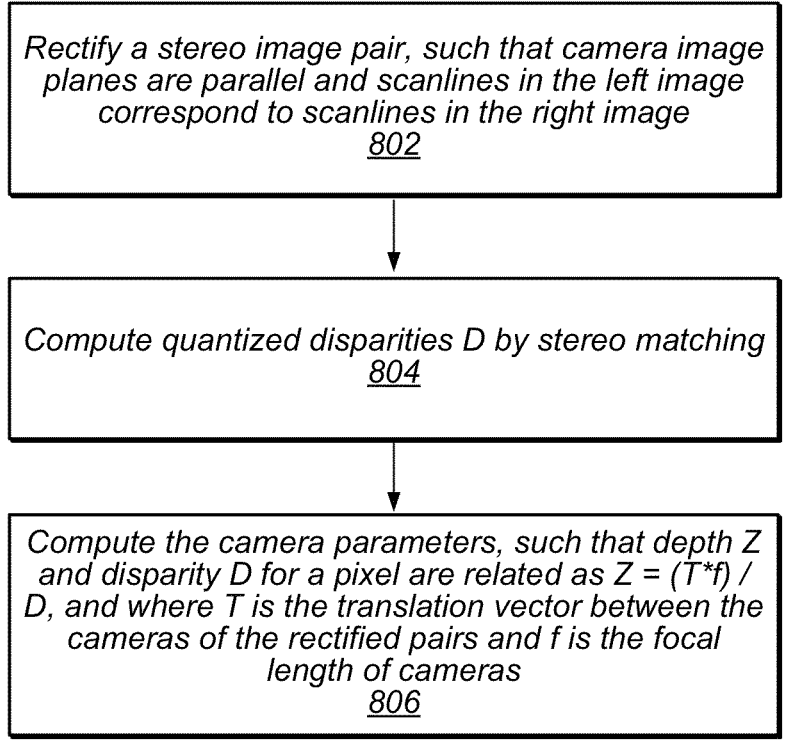
FIG. 8 is a flowchart of an embodiment of optimizing a function of three-dimensional geometry, according to some embodiments.

FIG. 8 is a flowchart of an embodiment of optimizing a function of three-dimensional geometry, according to some embodiments. A stereo image pair is rectified, such that camera image planes are parallel and scanlines in the left image correspond to scanlines in the right image (block 802). Quantized disparities D are computed by stereo matching (block 804). The camera parameters are computed, such that depth Z and disparity D for a pixel are related as Z=(T*f)/D, and where T is the translation vector between the cameras of the rectified pairs and f is the focal length of cameras (block 806).

Alternating Gradient Descent Method for Optimizing the Three-Dimensional Geometry Some embodiments employ an alternating gradient descent method for optimizing three-dimensional geometry (given the other imaging parameters), in which fidelity of the left rendered image is improved while keeping the fidelity of the right rendered image the same, and the fidelity of the right rendered image is improved while keeping the fidelity of the left rendered image the same. In some embodiments, this is accomplished by moving vertices along rays to the right camera center to improve the left rendered image, and then moving vertices along rays to the left camera center to improve the right rendered image.

Numerically Computing the Gradient of the Fidelity Terms

Some embodiments numerically compute the gradient of the fidelity terms (which measure how close the rendered images are to the input images) with respect to vertices. To compute the partial derivative with respect to one of the vertices, the vertex is perturbed slightly and the scene is re-rendered using the GPU (graphics processing unit) to the view being improved (for example the left view) in the current alternating step.

The image difference $D(\bar{I}_L, I_L)$ between the rendered scene with the single vertex moved and the rendered scene without the vertex movement gives an estimate of the partial derivative needed for the alternating gradient descent method (after dividing by the small amount of vertex motion). The speed of the above computation is greatly increased by the following approximation. When moving vertex $V_i$, some embodiments only render a local area around the projection of $V_i$ by rendering only a local area of the triangle meshes around $V_i$. The local area around $V_i$ may contain vertices from different connected mesh components. Then embodiments only compare this local area to the same area in $I_L$ instead of comparing the entire images. This is a good approximation because differences in the left rendered image $\bar{I}_L$ before and after moving a single vertex $V_i$ by a small amount will usually occur only in a local area around the projection of Vi onto the left image plane.

Some results of embodiments are shown in FIGS. 9A-11E. These figures follow the same layout. The top row shows the stereo pair of images to model. In each of these examples, we assume that the camera parameters $C_L, C_R$ are known. In fact, these examples are from the Middlebury data set and the camera parameters are provided as part of the data set. "Ground truth" disparity maps are also provided in the data set. The middle row, left image (i.e., FIG. 9C, FIG. 10C, and FIG. 11C) shows the three-dimensional model constructed from the ground truth disparity maps. Note that the ground truth disparities and therefore the derived ground truth depths are heavily quantized. Depth discontinuities and hence the set of edges E are determined from the ground truth disparity maps.

The bottom image in each of the figures (i.e., FIG. 9E, FIG. 10E, and FIG. 11E) shows the result of running embodiments as described herein. Some embodiments dramatically reduce the quantization effects while maintaining fidelity to the input images. The middle row, right image (i.e., FIG. 9D, FIG. 10D, and FIG. 11D) shows the three-dimensional model constructed from quantized ground truth disparities after adding noise. The result after running embodiments starting from this noisy depth map is similar to the result shown in the bottom row. These results show that some embodiments significantly improve a decent but highly quantized and noisy initial estimate of the three-dimensional scene.

FIG. 9A illustrates a left image in a stereo input pair of images, according to some embodiments. Bowling balls 900a-900c and bowling pins 902a-902c are visible.

FIG. 9B depicts a right image in a stereo input pair of images, according to some embodiments. Bowling balls 904a-904c and bowling pins 906a-906c are visible.

Figures 9C, 9D:
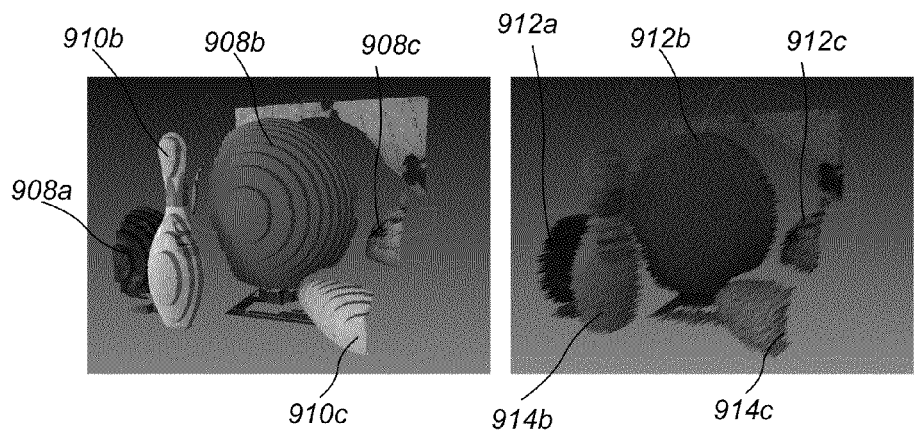
FIG. 9C illustrates a three-dimensional model constructed from ground truth disparity maps, according to some embodiments.
FIG. 9D depicts a three-dimensional model constructed from quantized ground truth disparities with added noise, according to some embodiments.

FIG. 9C illustrates a three-dimensional model constructed from ground truth disparity maps, according to some embodiments. Bowling balls 908a-908c and bowling pins 910b-910c are visible.

FIG. 9D depicts a three-dimensional model constructed from quantized ground truth disparities with added noise, according to some embodiments. Bowling balls 912a-912c and bowling pins 914b-914c are visible.

Figure 9E:
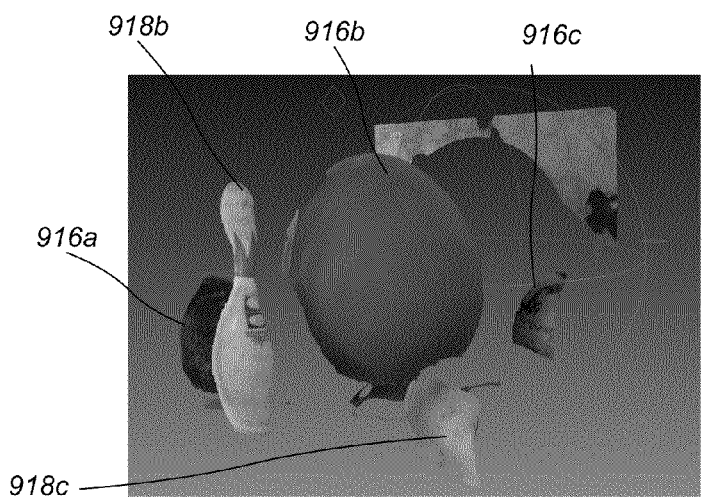
FIG. 9E illustrates a three-dimensional model resulting from running an optimization beginning from a ground truth model, according to some embodiments.

FIG. 9E illustrates a three-dimensional model resulting from running an optimization beginning from a ground truth model, according to some embodiments. Bowling balls 916a-916c and bowling pins 918b-918c are visible. The result shown FIG. 9E of the embodiment on noisy input is roughly equivalent to the output starting from ground truth without any noise.

Figures 10A, 10B:
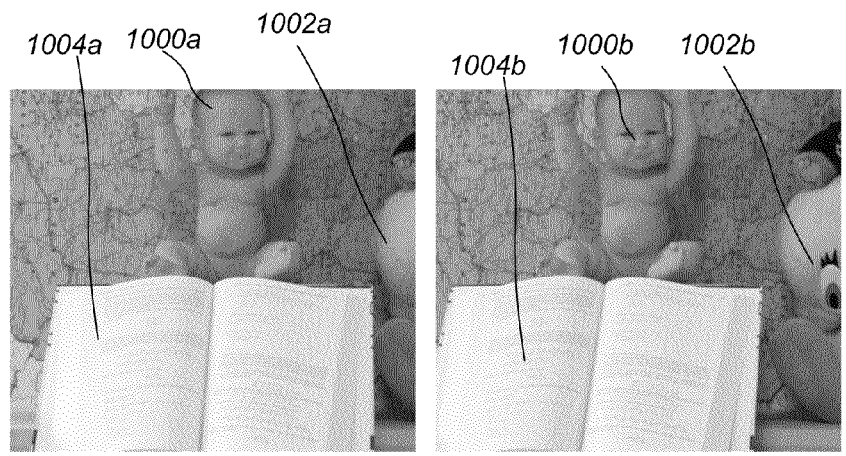
FIG. 10A depicts a left image in a stereo input pair of images, according to some embodiments.
FIG. 10B illustrates a right image in a stereo input pair of images, according to some embodiments.

FIG. 10A depicts a left image in a stereo input pair of images, according to some embodiments. Note baby 1000a, duck 1002a, and book 1004a.

FIG. 10B illustrates a right image in a stereo input pair of images, according to some embodiments. Note baby 1000b, duck 1002b, and book 1004b.

Figures 10C, 10D:
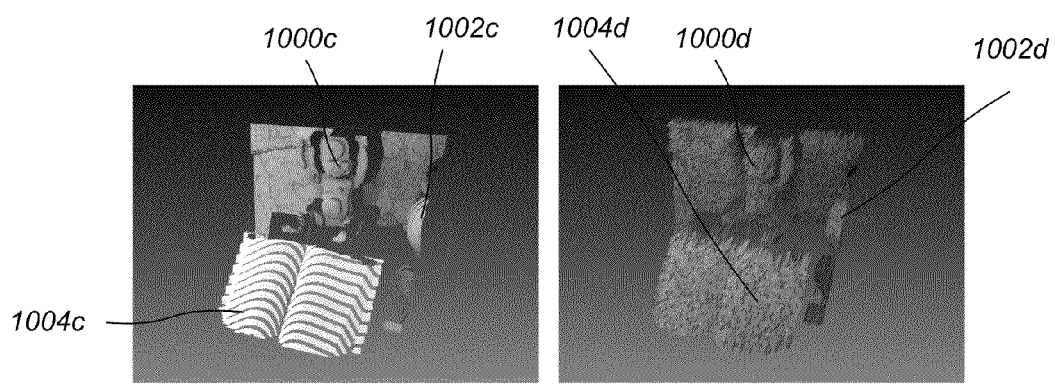
FIG. 10C depicts a three-dimensional model constructed from ground truth disparity maps, according to some embodiments.
FIG. 10D illustrates a three-dimensional model constructed from quantized ground truth disparities with added noise, according to some embodiments.

FIG. 10C depicts a three-dimensional model constructed from ground truth disparity maps, according to some embodiments. Note baby 1000c, duck 1002c, and book 1004c.

FIG. 10D illustrates a three-dimensional model constructed from quantized ground truth disparities with added noise, according to some embodiments. Note baby 1000d, duck 1002d, and book 1004d.

Figure 10E:
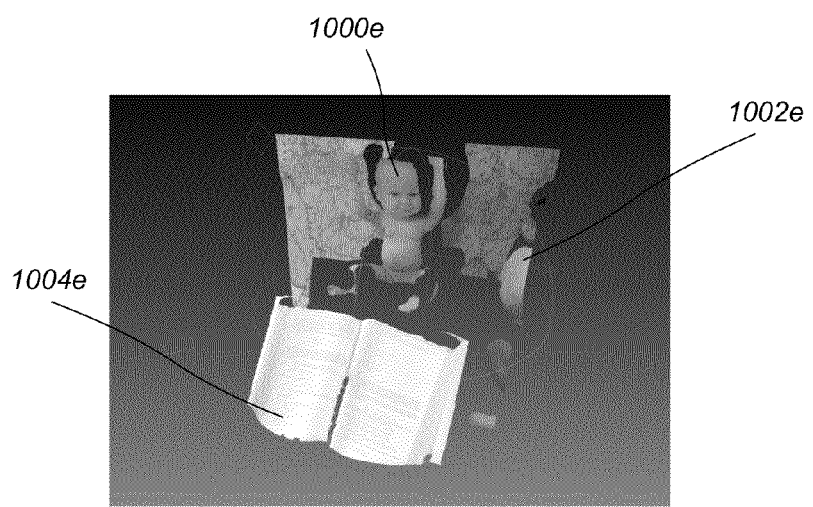
FIG. 10E depicts a three-dimensional model resulting from running an optimization beginning from a ground truth model, according to some embodiments.

FIG. 10E depicts a three-dimensional model resulting from running an optimization beginning from a ground truth model, according to some embodiments. Note baby 1000e, duck 1002e, and book 1004e. The result shown FIG. 10E of the embodiment on noisy input is roughly equivalent to the output starting from ground truth without any noise.

Figures 11A, 11B:
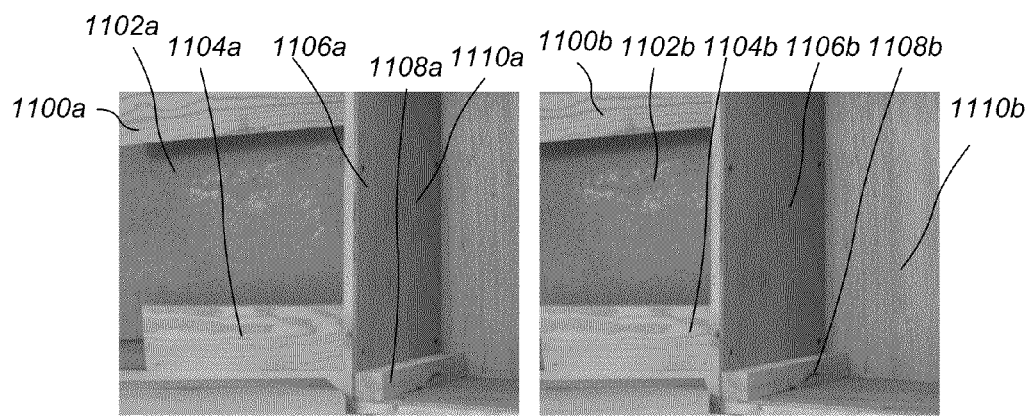
FIG. 11A illustrates a left image in a stereo input pair of images, according to some embodiments.
FIG. 11B depicts a right image in a stereo input pair of images, according to some embodiments.

FIG. 11A illustrates a left image in a stereo input pair of images, according to some embodiments. Note surfaces 1100a-1110a.

FIG. 11B depicts a right image in a stereo input pair of images, according to some embodiments. Note surfaces 1100b-1110b.

Figures 11C, 11D:
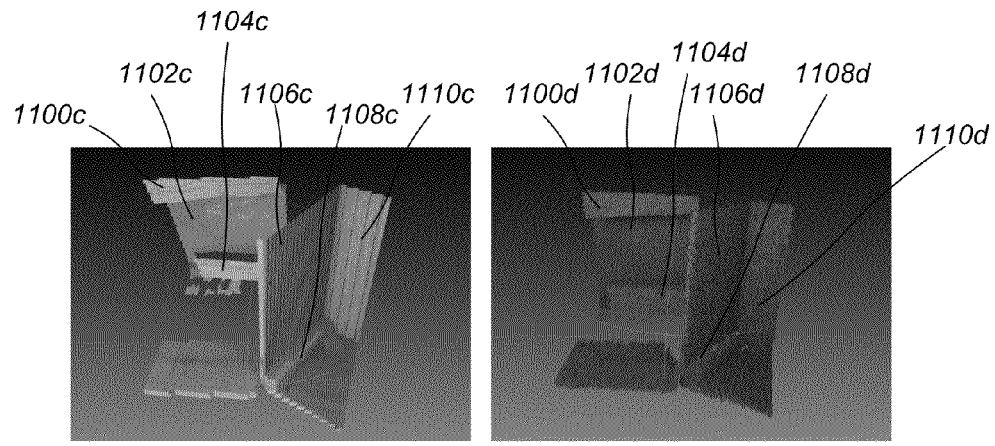
FIG. 11C illustrates a three-dimensional model constructed from ground truth disparity maps, according to some embodiments.
FIG. 11D depicts a three-dimensional model constructed from quantized ground truth disparities with added noise, according to some embodiments.

FIG. 11C illustrates a three-dimensional model constructed from ground truth disparity maps, according to some embodiments. Note surfaces 1100c-1110c.

FIG. 11D depicts a three-dimensional model constructed from quantized ground truth disparities with added noise, according to some embodiments. Note surfaces 1100d-1110d.

Figure 11E:
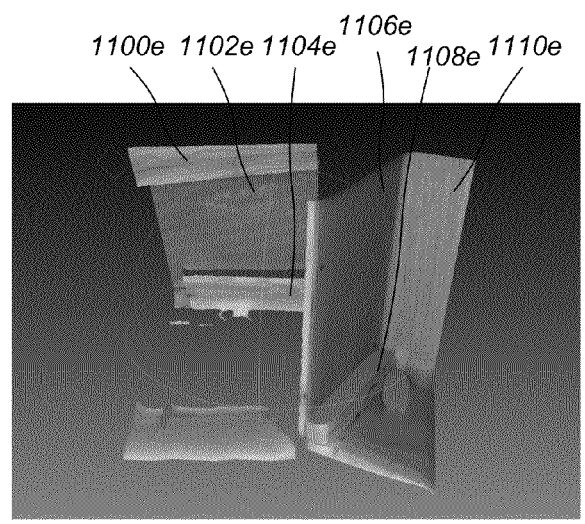
FIG. 11E illustrates a three-dimensional model resulting from running an optimization beginning from a ground truth model, according to some embodiments.

FIG. 11E illustrates a three-dimensional model resulting from running an optimization beginning from a ground truth model, according to some embodiments. Note surfaces 1100e-1110e. The result shown FIG. 11E of the embodiment on noisy input is roughly equivalent to the output starting from ground truth without any noise.

Stereo-Aware Editing

Figure 12:
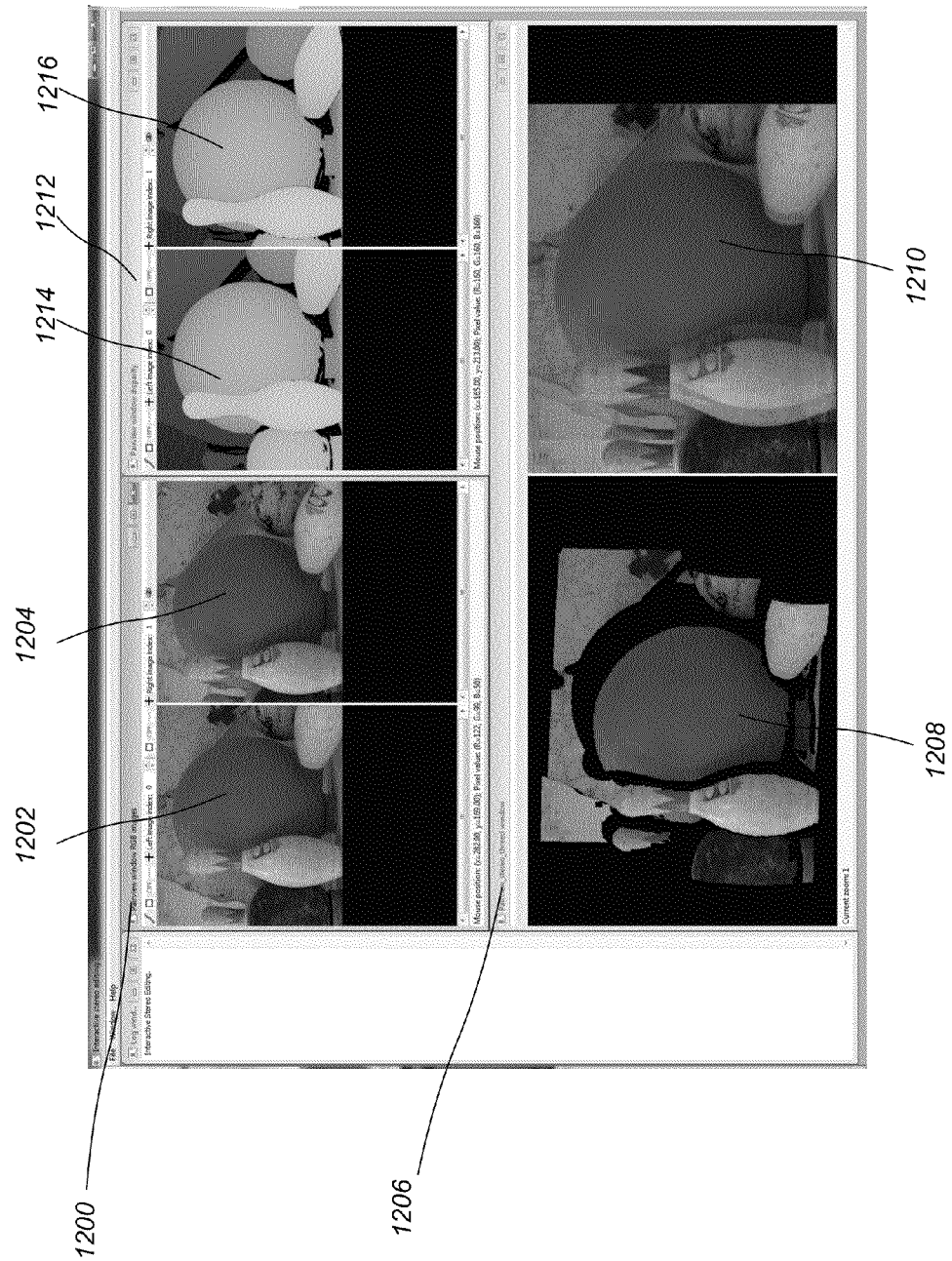
FIG. 12 depicts a user interface for stereo-aware editing, according to some embodiments.

FIG. 12 depicts a user interface for stereo-aware editing, according to some embodiments. The upper left window 1200 shows the stereo pair of images 1202 and 1204 to edit, along with some controls along the top to invoke specific stereo-aware editing operations. The lower window 1206 is divided into two sections. On the lower left, the three-dimensional model of the stereo pair of images 1208 is shown. The user may change the viewpoint of this three-dimensional model in order to inspect different aspects of it. On the lower right, a three-dimensional display of the stereo pair 1210 is shown. In this example, a red-cyan encoding of the stereo pair is used so that the user can see the stereo pair in three-dimensional with red-cyan three-dimensional glasses with an ordinary monitor. Other three-dimensional displays are possible here, for example using NVidia active shutter glasses with a three-dimensional-capable monitor that supports the NVidia three-dimensional Vision display technology. The user may select the type of three-dimensional display to show in the lower right area. The upper right 1212 window shows a disparity map for the scene in the left image 1214 and right image 1216. Optionally, any of the lower left 1208, lower right 1210, or upper right 1212 displays may be hidden by the user while editing the stereo images.

Stereo-Aware Painting

Some embodiments include a user interface for a paint brush tool on stereo input pairs. One embodiment of such a stereo-aware painting tool functions as follows:

1. The user selects paint brush size and type (e.g. the shape and color of the brush) and brushes on one of the images in the stereo pair.
2. The system identifies the part of the three-dimensional model for the input stereo scene which corresponds to the pixels painted in step 1.
3. The colors assigned to the three-dimensional model vertices determined in step 2 are updated to match the colors brushed on the image in step 1. That is, the mapping T of vertices to colors is updated. A copy of the three-dimensional scene before this step may be kept in order to be able to undo this edit or if the user wants to erase some or all of the paint.
4. The other image (the one not painted in step 1) is re-rendered using the update three-dimensional model from step 3.

Note: Steps 2, 3, and 4 may be done for each brush hit received by the user interface or once the user completes a paint stroke and lets the mouse up. In some embodiments, the updated other image may be shown to the user with each new brush hit in step 1 or once the user completes a paint stroke and lets the mouse up. Optionally, the three-dimensional model and/or a three-dimensional display of the stereo pair may be shown to the user at any point in the usage of the painting tool, including after each brush hit while the user is painting, or once the user completes a paint stroke and lets the mouse up, or in response to further user input indicating the desire to see the three-dimensional model or the three-dimensional display.

Goto step 1 for more brush hits, with the same brush or possibly with a different brush. The user may continue painting in the same image or may switch to painting in the other input image.

Figure 13:
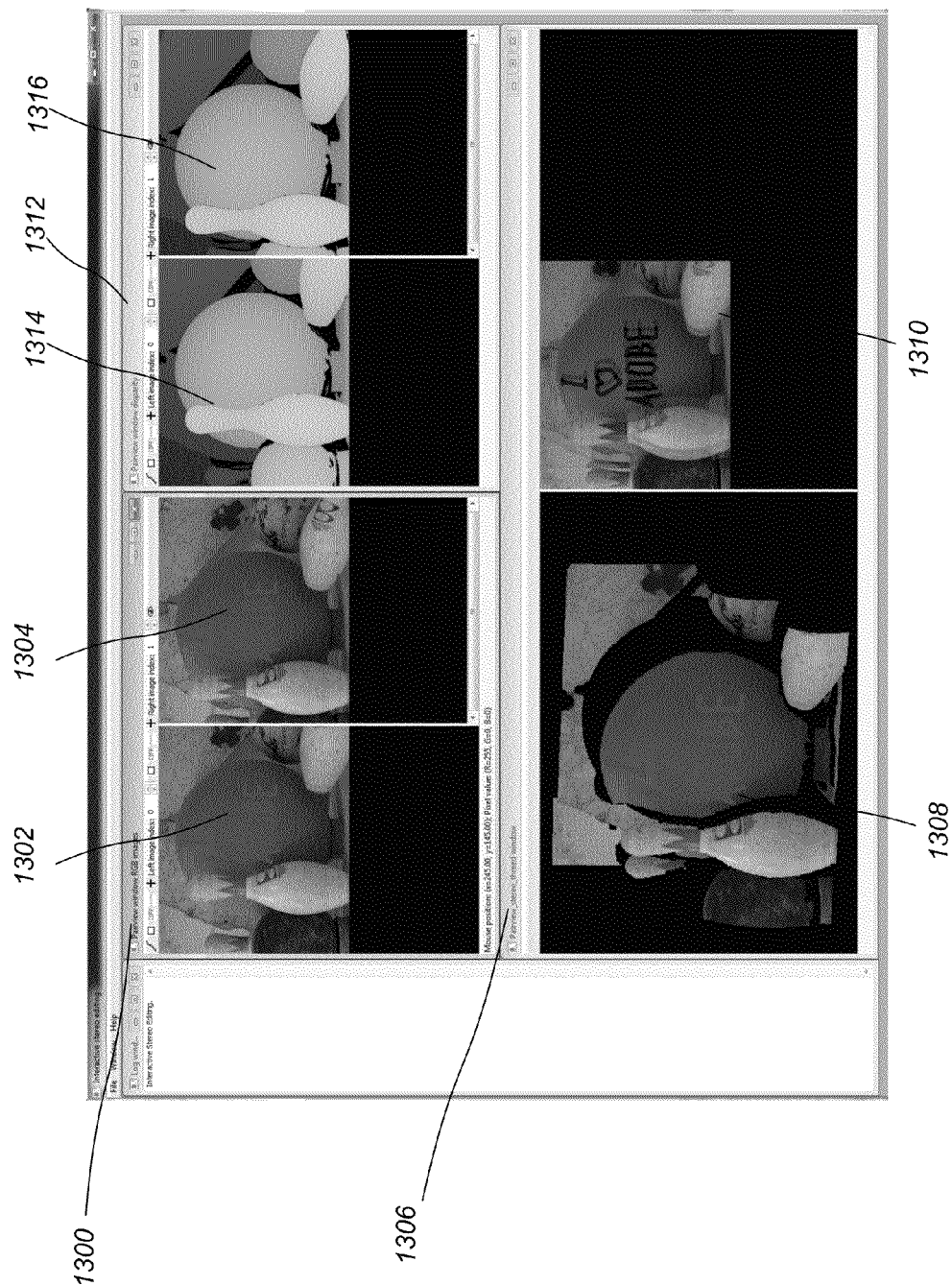
FIG. 13 illustrates a user interface for stereo-aware painting, according to some embodiments.

FIG. 13 illustrates a user interface for stereo-aware painting, according to some embodiments. The upper left window 1300 shows the stereo pair of images 1302 and 1304 to edit, along with some controls along the top to invoke specific stereo-aware editing operations. In the example of FIG. 13, "I heart Adobe" is painted onto the green bowling ball of images 1302 and 1304. In this example, the user painted in the left image 1302, and a three-dimensionally-consistent edited right image is generated via rendering the edited three-dimensional model. Note that the user can paint in the stereo pair without needing to see the underlying three-dimensional model being used to drive the three-dimensional-consistent image editing. The upper right 1312 window shows a disparity map for the scene in the left image 1314 and right image 1316. The lower window 1306 is divided into two sections. On the lower left, the three-dimensional model of the stereo pair of images 1308 is shown. On the lower right, a three-dimensional display of the stereo pair 1310 is shown.

Figure 14:
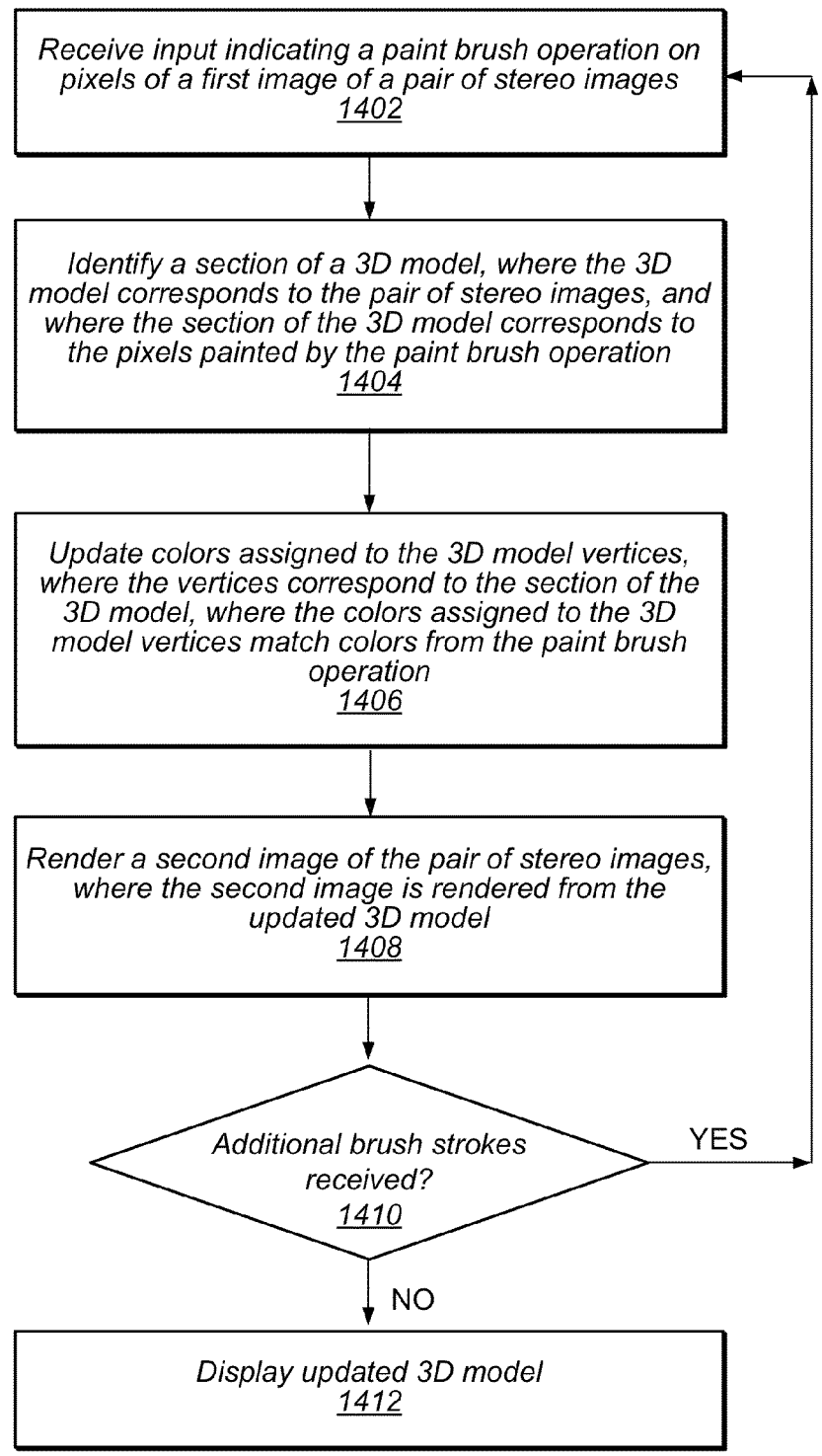
FIG. 14 is a flowchart of an embodiment of updating colors in a three-dimensional model corresponding to painting operations on a stereo pair of images, according to some embodiments.

FIG. 14 is a flowchart of an embodiment of updating colors in a three-dimensional model corresponding to painting operations on a stereo pair of images, according to some embodiments. Input indicating a paint brush operation on pixels of a first image of a pair of stereo images is received (block 1402). A section of a 3D model, where the 3D model corresponds to the pair of stereo images, and where the section of the 3D model corresponds to the pixels painted by the paint brush operation, is identified (block 1404). Colors assigned to the 3D model vertices, where the vertices correspond to the section of the 3D model, where the colors assigned to the 3D model vertices match colors from the paint brush operation, are updated (block 1406). A second image of the pair of stereo images, where the second image is rendered from the updated 3D model, is rendered (block 1408). A determination is made as to whether additional brush strokes have been received (block 1410). If additional brush strokes have been received, the process returns to block 1402, which is described above. If additional brush strokes have not been received, an updated three-dimensional model is displayed (block 1412).

Stereo-Aware Copy and Paste

Some embodiments include an image editing user interface for a Copy and-Paste tool on stereo input pairs. Some embodiments operate as follows:

Use an image selection tool to identify the pixels in an object to copy from a source stereo pair.

Extract the part of the three-dimensional model for the source stereo pair which corresponds to the selected object pixels.

Paste the three-dimensional object model from the source into the three-dimensional scene model for the destination.

Transform and position the source object within the destination scene. In one implementation, the two-dimensional position of the pasted object can be adjusted by moving the mouse, its depth can be adjusted by using the scroll wheel on the mouse to move the object closer or further away from the camera, and its global scale can also be adjusted using the scroll wheel when a modifier key is pressed.

In some embodiments, the edited images are the rendered versions of the modified destination scene and are displayed while the user is adjusting the pasted source object. The transformation and positioning of the pasted image are done with a traditional two-dimensional user interface and the user never needs to see the three-dimensional representation. To help illustrate the method, figures included herein show how the underlying three-dimensional models are being manipulated behind the scenes to create the edited stereo pair. In some implementations, a user may also want to view the underlying three-dimensional models and make adjustments directly with the three-dimensional models instead of through two-dimensional image tools.

Figure 15:
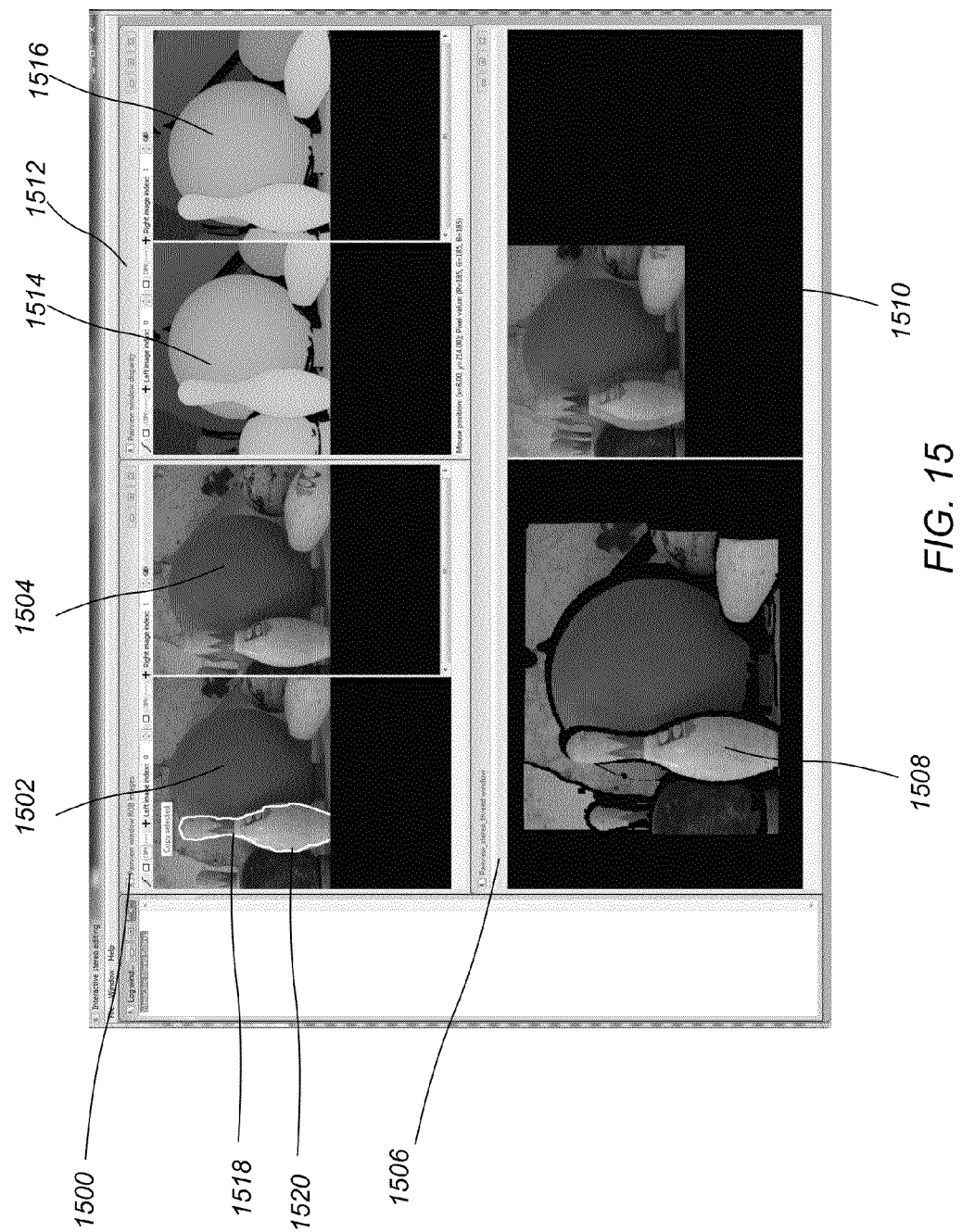
FIG. 15 depicts a user interface for stereo-aware copy and paste, where a white line indicates a selection, according to some embodiments.
Figure 16:
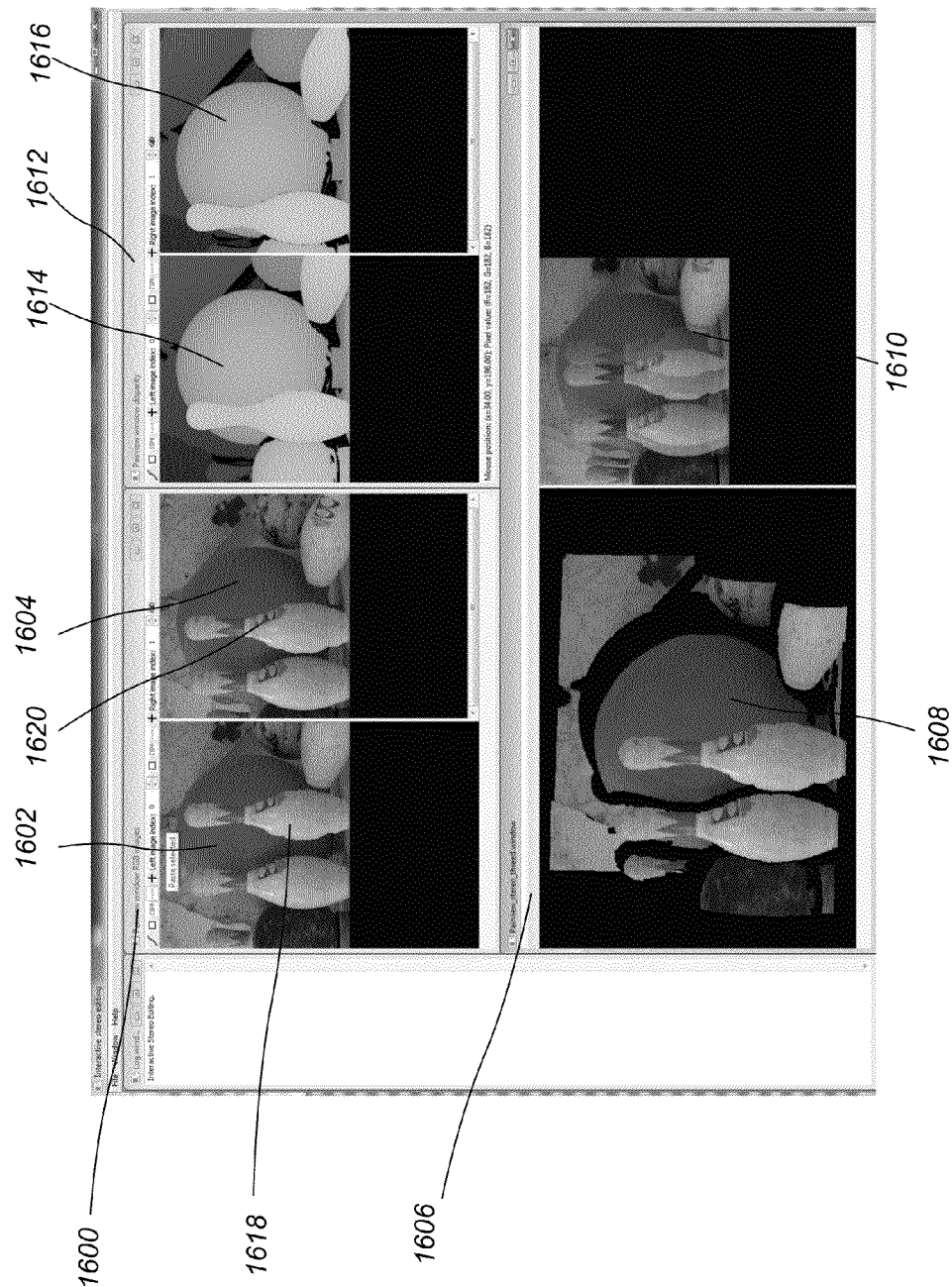
FIG. 16 illustrates a user interface for stereo-aware copy and paste, where a section of an image has been copied into a same stereo pair of images, according to some embodiments.

The Copy-and-Paste operation is illustrated with an example in FIGS. 15-18 In FIG. 15, selection and copy of a bowling pin from the Bowling2 stereo input pair are shown. In FIG. 16, the result of pasting the bowling pin into the same stereo pair in front of the green bowling bowl is shown.

FIG. 15 depicts a user interface for stereo-aware copy and paste, where a white line indicates a selection, according to some embodiments. The upper left window 1500 shows the stereo pair of images 1502 and 1504 to edit, along with some controls along the top to invoke specific stereo-aware editing operations. In this example, the user selected a bowling pin 1518, indicated by a white outline 1520 in the left image 1502. The upper right 1512 window shows a disparity map for the scene in the left image 1514 and right image 1516. The lower window 1506 is divided into two sections. On the lower left, the three-dimensional model of the stereo pair of images 1508 is shown. On the lower right, a three-dimensional display of the stereo pair 1510 is shown.

FIG. 16 illustrates a user interface for stereo-aware copy and paste, where a section of an image has been copied into a same stereo pair of images, according to some embodiments. The upper left window 1600 shows the stereo pair of images 1602 and 1604 to edit, along with some controls along the top to invoke specific stereo-aware editing operations. In this example, the user pastes a new bowling pin 1618, in the left image 1602. A new bowling pin 1620 is added to the right image 1604. The upper right 1612 window shows a disparity map for the scene in the left image 1614 and right image 1616. The lower window 1606 is divided into two sections. On the lower left, the three-dimensional model of the stereo pair of images 1608 is shown. On the lower right, a three-dimensional display of the stereo pair 1610 is shown.

Figure 17:
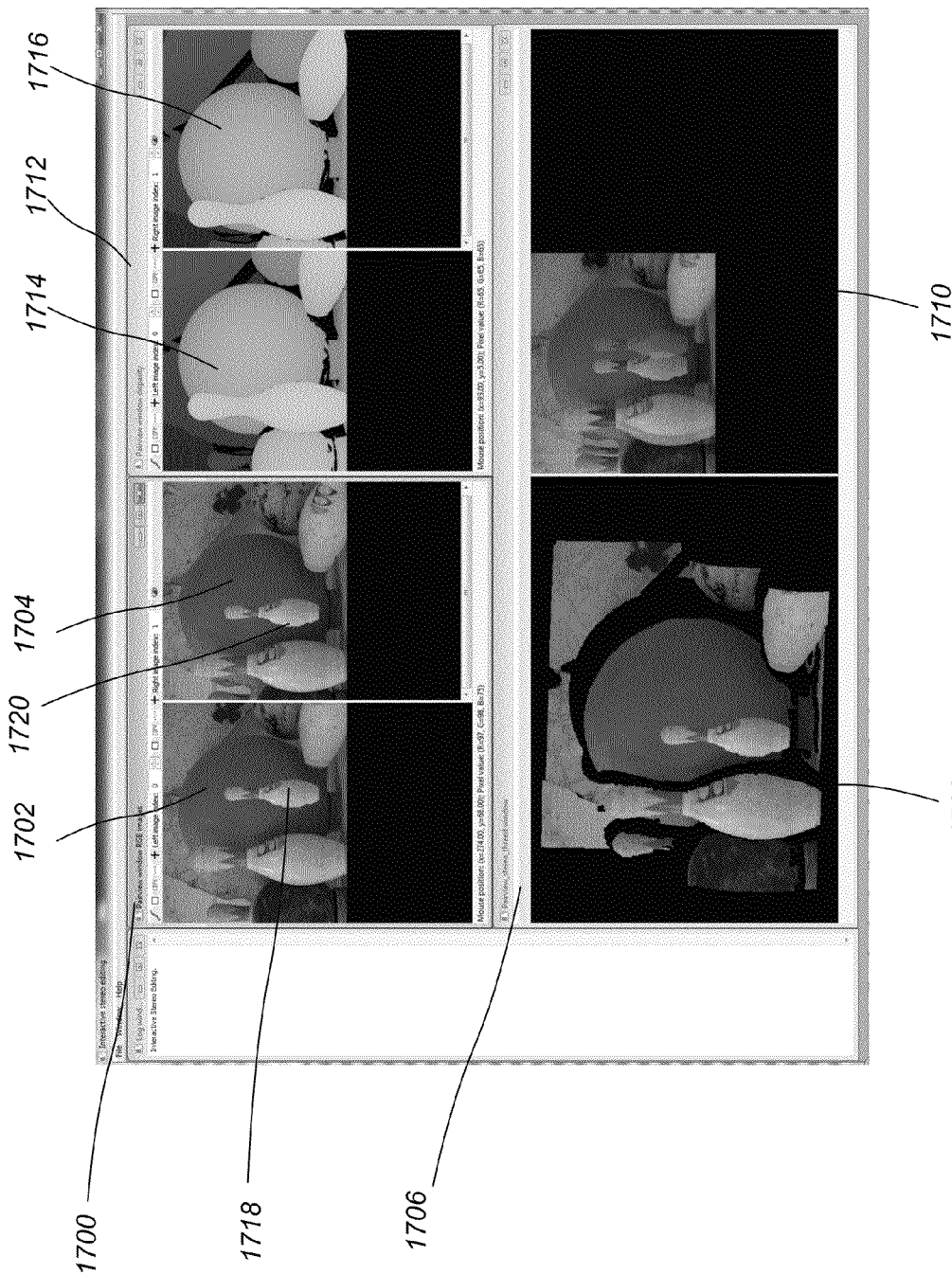
FIG. 17 depicts a user interface depicting stereo-aware copy and paste, where a pasted object is scaled, according to some embodiments.
Figure 18:
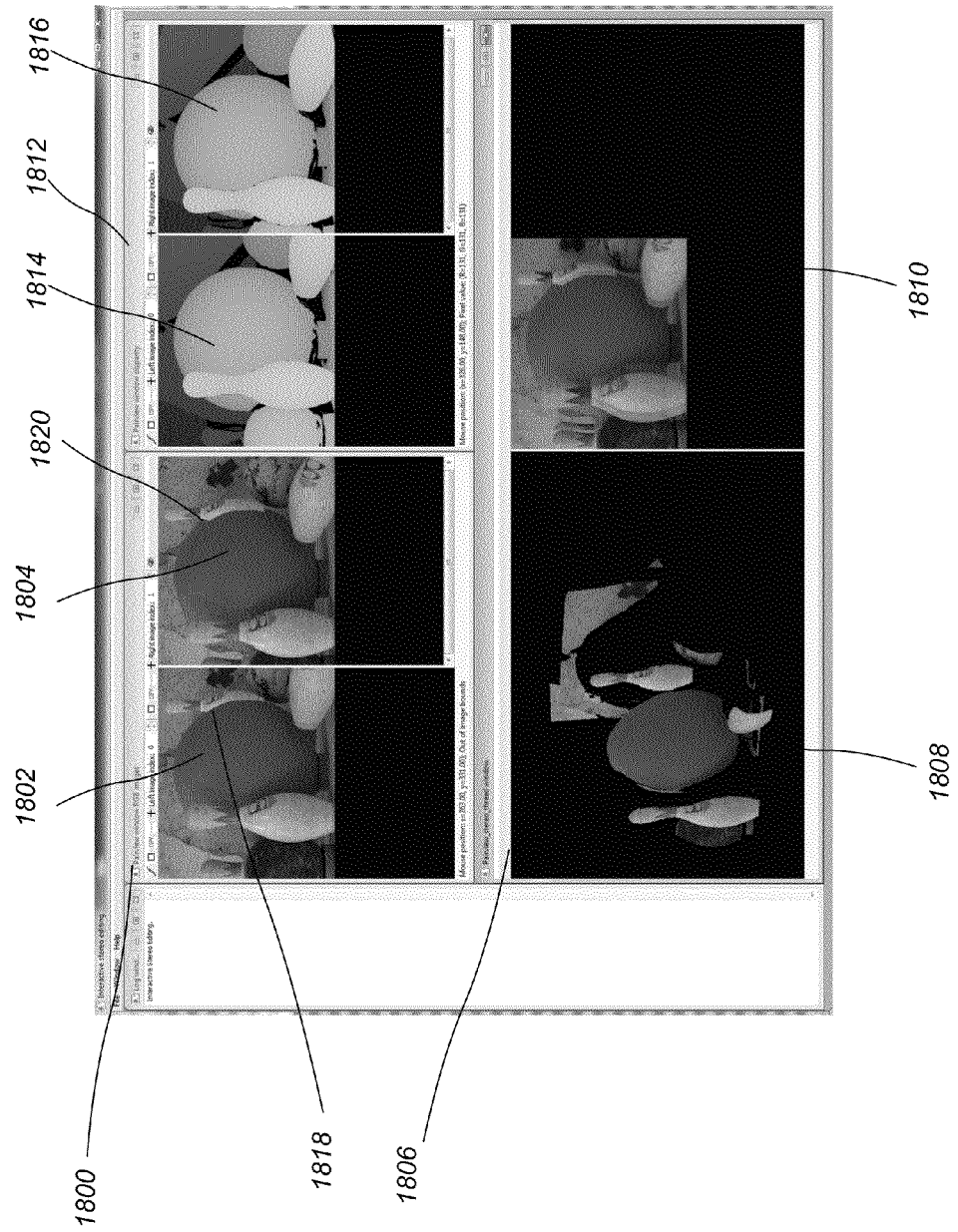
FIG. 18 illustrates a user interface depicting stereo-aware copy and paste, where a pasted object is moved in three-dimensional space, according to some embodiments.

Once a user pastes an object into a stereo pair, the user needs to transform and position the object to achieve the desired effect of editing (step 4 above). In FIG. 17, the user scales down the pasted object. In FIG. 18, the user positions the pin in a new location. Here the user moves the pin back in depth until it is behind the bowling ball but such that the top of the pin is still visible from the input views.

FIG. 17 depicts a user interface depicting stereo-aware copy and paste, where a pasted object is scaled, according to some embodiments. The upper left window 1700 shows the stereo pair of images 1702 and 1704 to edit, along with some controls along the top to invoke specific stereo-aware editing operations. In this example, the user downscales new bowling pin 1718, in the left image 1702. A downscaled bowling pin 1720 is added to the right image 1704. The upper right 1712 window shows a disparity map for the scene in the left image 1714 and right image 1716, prior to addition of the downscaled pin. The lower window 1706 is divided into two sections. On the lower left, the three-dimensional model of the stereo pair of images 1708 is shown. On the lower right, a three-dimensional display of the stereo pair 1710 is shown.

FIG. 18 illustrates a user interface depicting stereo-aware copy and paste, where a pasted object is moved in three-dimensional space, according to some embodiments. The upper left window 1800 shows the stereo pair of images 1802 and 1804 to edit, along with some controls along the top to invoke specific stereo-aware editing operations. In this example, the user sends to the background a new bowling pin 1818, in the left image 1802. A new bowling pin 1820 is added to the background in the right image 1804. The upper right 1812 window shows a disparity map for the scene in the left image 1814 and right image 1816. The lower window 1806 is divided into two sections. On the lower left, the three-dimensional model of the stereo pair of images 1808 is shown. On the lower right, a three-dimensional display of the stereo pair 1810 is shown.

Figure 19:
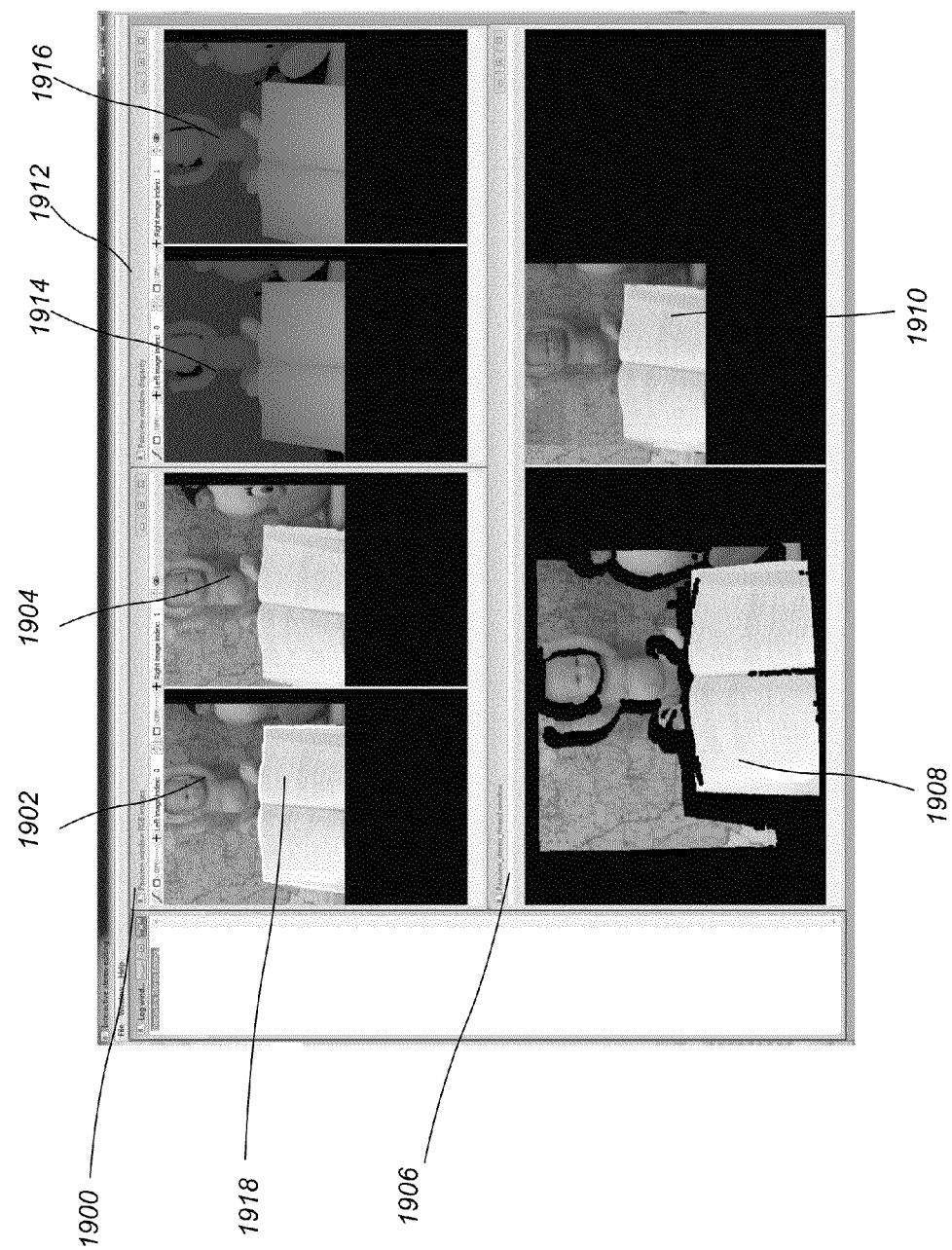
FIG. 19 depicts a user interface depicting stereo-aware copy and paste, where a selection is indicated for a paste operation from one stereo pair to another stereo pair, according to some embodiments.
Figure 20:
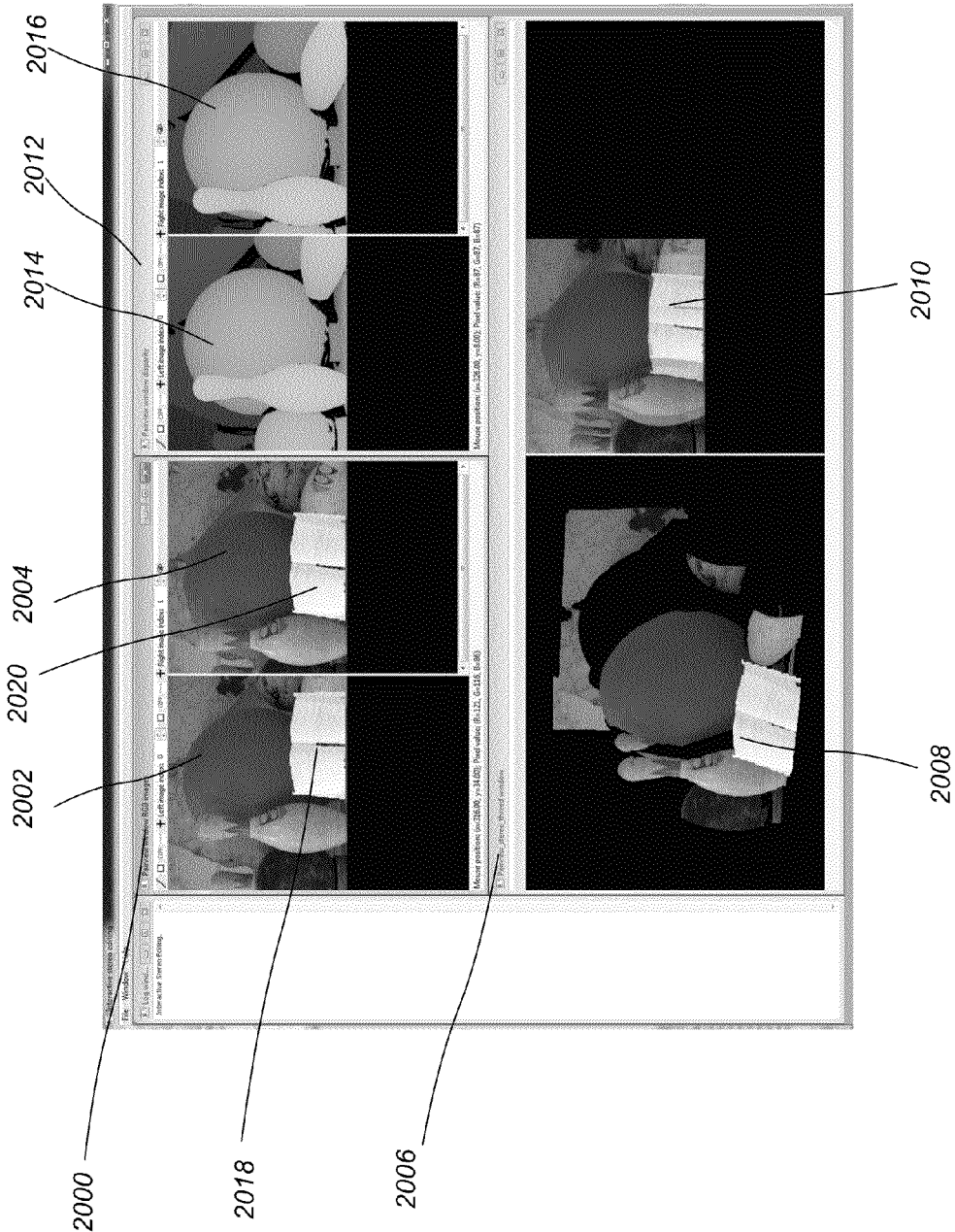
FIG. 20 illustrates a user interface depicting stereo-aware copy and paste, where a paste operation has been performed from one stereo pair to another stereo pair, according to some embodiments.

FIGS. 19-20 show an example of copying from one stereo pair and pasting into a different stereo pair. In FIG. 19, selection and copying of the book from the Baby2 input stereo pair are shown. In FIG. 20, the result of pasting the book in front of the green bowling ball in the Bowling2 stereo pair is shown. Some embodiments use the exact three-dimensional geometry of objects.

FIG. 19 depicts a user interface depicting stereo-aware copy and paste, where a selection is indicated for a paste operation from one stereo pair to another stereo pair, according to some embodiments. The upper left window 1900 shows the stereo pair of images 1902 and 1904 to edit, along with some controls along the top to invoke specific stereo-aware editing operations. In this example, the user selects the book 1918 in the left image 1902. The upper right 1912 window shows a disparity map for the scene in the left image 1914 and right image 1916. The lower window 1906 is divided into two sections. On the lower left, the three-dimensional model of the stereo pair of images 1908 is shown. On the lower right, a three-dimensional display of the stereo pair 1910 is shown.

FIG. 20 illustrates a user interface depicting stereo-aware copy and paste, where a paste operation has been performed from one stereo pair to another stereo pair, according to some embodiments. The upper left window 2000 shows the stereo pair of images 2002 and 2004 to edit, along with some controls along the top to invoke specific stereo-aware editing operations. In this example, the user adds book 2018, in the left image 2002. Book 2020 is added to the background in the right image 2004. The upper right 2012 window shows a disparity map for the scene in the left image 2014 and right image 2016. The lower window 2006 is divided into two sections. On the lower left, the three-dimensional model of the stereo pair of images 2008 is shown. On the lower right, a three-dimensional display of the stereo pair 2010 is shown.

While an implementation of an example user interface has been shown, one of skill in the art will readily ascertain from having read the present disclosure that many configurations of user interface are contemplated within the disclosure herein presented. Among other options, while a three-dimensional model is shown to the user in the examples presented herein, one of skill in the art will readily ascertain in light of having read the present disclosure that some embodiment omit display of the three-dimensional model in favor of highlighting attention to the two-dimensional images.

Example Operations

Figure 21:
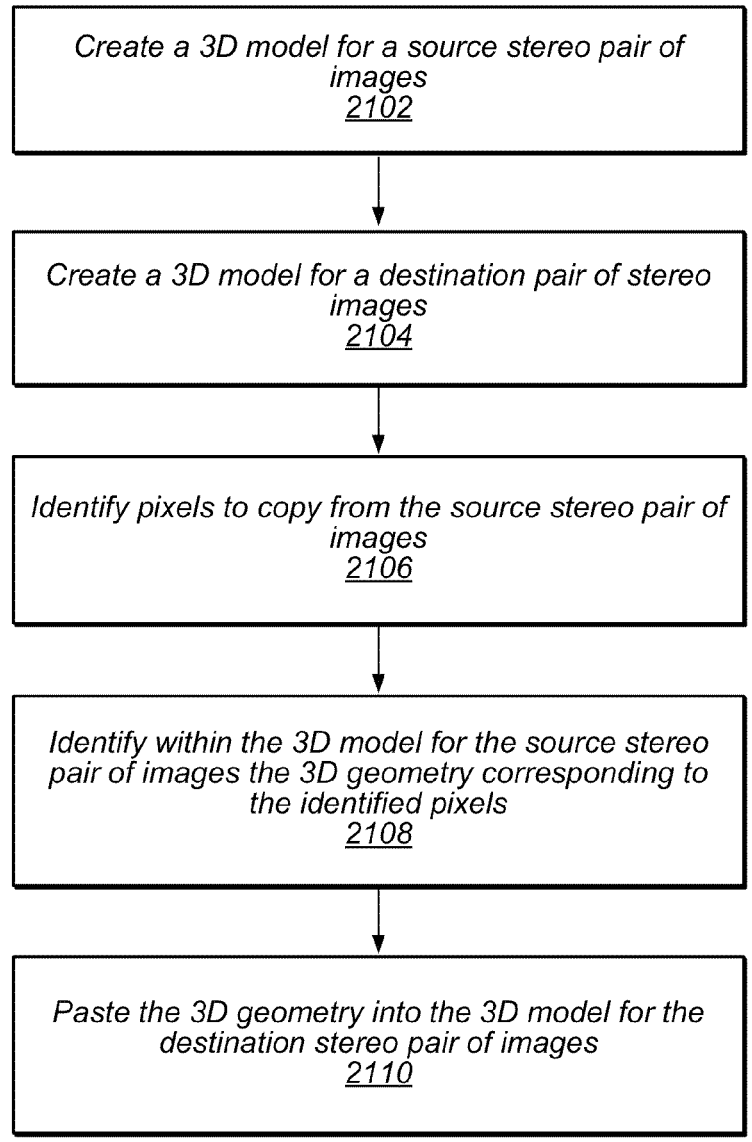
FIG. 21 is a flowchart of an embodiment of a copy and paste operation within a three-dimensional model of stereo scenes for stereo aware image editing.

FIG. 21 is a flowchart of an embodiment of a copy and paste operation within a three-dimensional model of stereo scenes for stereo aware image editing. A three-dimensional model for a source stereo pair of images is created (block 2102). A three-dimensional model for a destination pair of stereo images is created (block 2104). Pixels to copy from the source stereo pair of images are identified (block 2106). The three-dimensional geometry corresponding to the identified pixels is identified within the three-dimensional model for the source stereo pair of images (block 2108). The three-dimensional geometry is pasted into the three-dimensional model for the destination stereo pair of images (block 2110).

Figure 22:
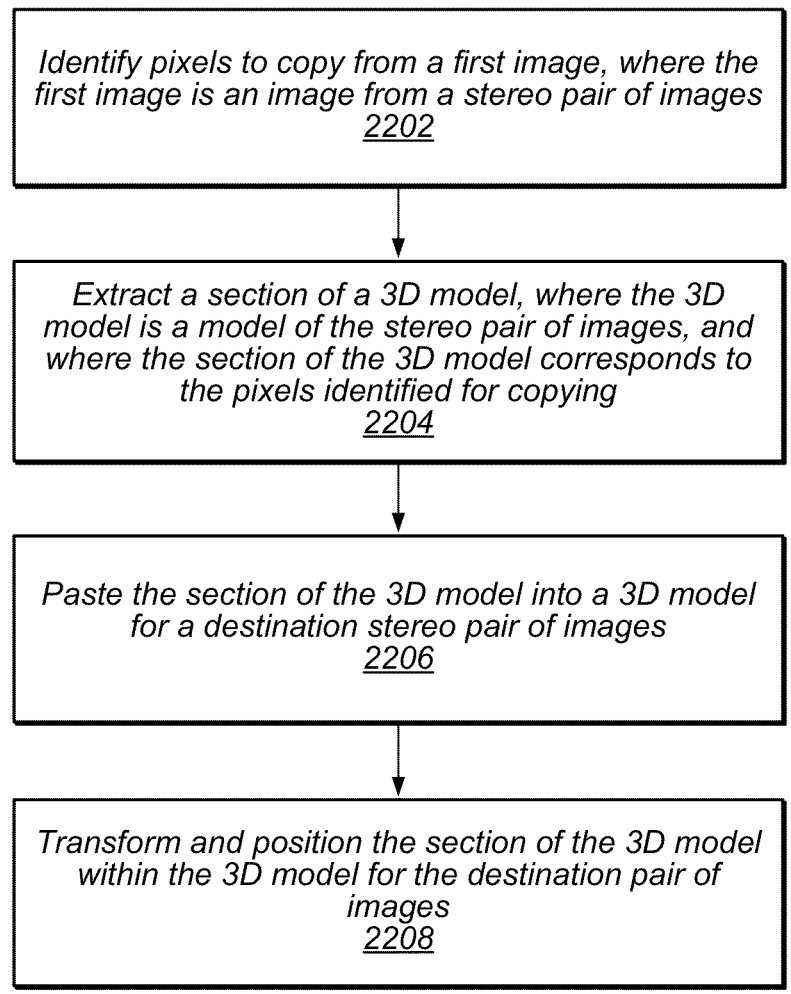
FIG. 22 is a flowchart of an embodiment of a copy and paste operation on an image of a stereo pair of images and corresponding modifications to a three-dimensional model based on the stereo pair of images, according to some embodiments.
Figure 23:
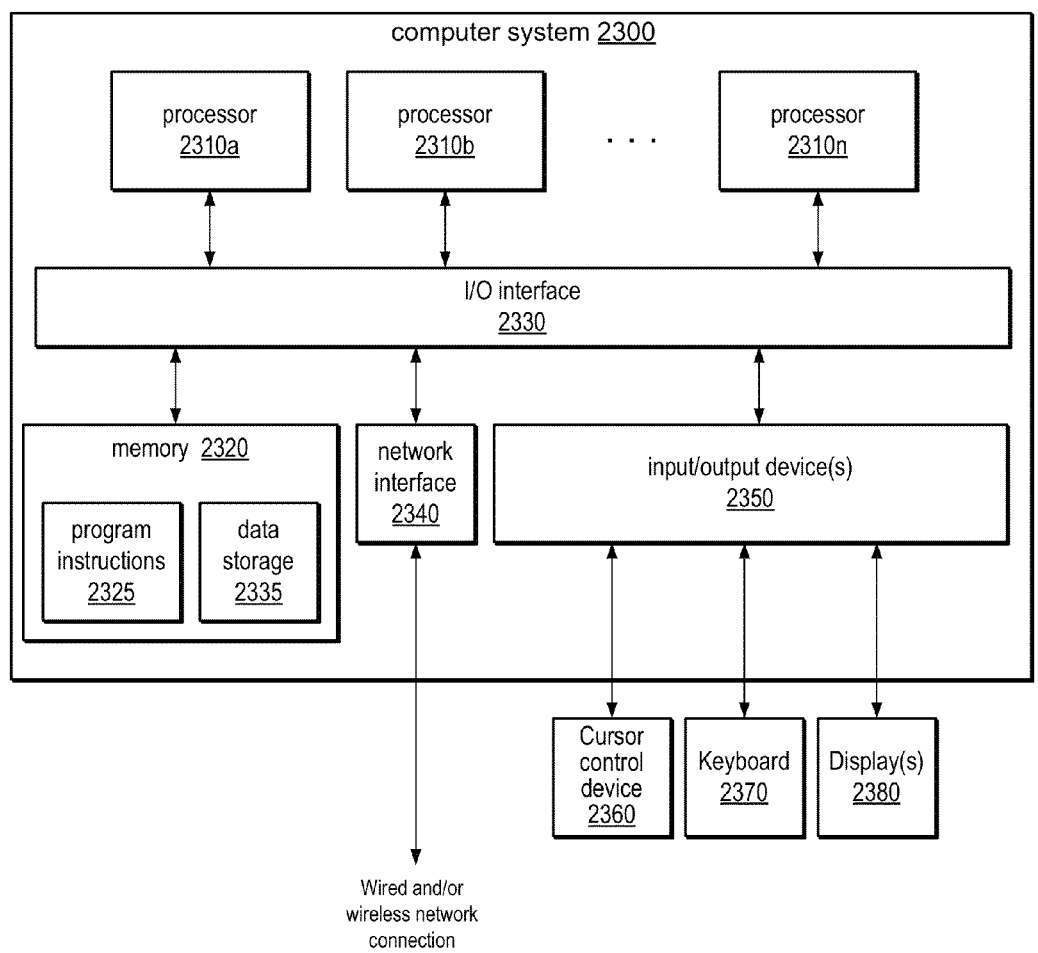
FIG. 23 illustrates an example computer system that may be used in an embodiment.

FIG. 22 is a flowchart of an embodiment of a copy and paste operation on an image of a stereo pair of images and corresponding modifications to a three-dimensional model based on the stereo pair of images, according to some embodiments. Pixels to copy from a first image are identified, where the first image is an image from a stereo pair of images (block 2202). A section of a three-dimensional model is extracted, where the three-dimensional model is a model of the stereo pair of images, and where the section of the three-dimensional model corresponds to the pixels identified for copying (block 2204). The section of the three-dimensional model is pasted into a three-dimensional model for a destination stereo pair of images (block 2206). The section of the three-dimensional model is transformed and positioned within the three-dimensional model for the destination pair of images (block 2208).

Example System

Embodiments of a stereo image editing module and/or of the various stereo image editing techniques as described herein may be executed on one or more computer systems, which may interact with various other devices. One such computer system is illustrated by FIG. 23. In different embodiments, computer system 2300 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 2300 includes one or more processors 2310 coupled to a system memory 2320 via an input/output (I/O) interface 2330. Computer system 2300 further includes a network interface 2340 coupled to I/O interface 2330, and one or more input/output devices 2350, such as cursor control device 2360, keyboard 2370, and display(s) 2380. In some embodiments, it is contemplated that embodiments may be implemented using a single instance of computer system 2300, while in other embodiments multiple such systems, or multiple nodes making up computer system 2300, may be configured to host different portions or instances of embodiments. For example, in one embodiment some elements may be implemented via one or more nodes of computer system 2300 that are distinct from those nodes implementing other elements.

In various embodiments, computer system 2300 may be a uniprocessor system including one processor 2310, or a multiprocessor system including several processors 2310 (e.g., two, four, eight, or another suitable number). Processors 2310 may be any suitable processor capable of executing instructions. For example, in various embodiments, processors 2310 may be general-purpose or embedded processors implementing any of a variety of instruction set architectures (ISAs), such as the x86, PowerPC, SPARC, or MIPS ISAs, or any other suitable ISA. In multiprocessor systems, each of processors 2310 may commonly, but not necessarily, implement the same ISA.

In some embodiments, at least one processor 2310 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2320 may be configured to store program instructions and/or data accessible by processor 2310. In various embodiments, system memory 2320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a stereo image editing module are shown stored within system memory 2320 as program instructions 2325 and data storage 2335, respectively. In other embodiments, program instructions and/or data may be received, sent or stored upon different types of computer-accessible media or on similar media separate from system memory 2320 or computer system 2300. Generally speaking, a computer-accessible medium may include storage media or memory media such as magnetic or optical media, e.g., disk or CD/DVD-ROM coupled to computer system 2300 via I/O interface 2330. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2340.

In one embodiment, I/O interface 2330 may be configured to coordinate I/O traffic between processor 2310, system memory 2320, and any peripheral devices in the device, including network interface 2340 or other peripheral interfaces, such as input/output devices 2350. In some embodiments, I/O interface 2330 may perform any necessary protocol, timing or other data transformations to convert data signals from one component (e.g., system memory 2320) into a format suitable for use by another component (e.g., processor 2310). In some embodiments, I/O interface 2330 may include support for devices attached through various types of peripheral buses, such as a variant of the Peripheral Component Interconnect (PCI) bus standard or the Universal Serial Bus (USB) standard, for example. In some embodiments, the function of I/O interface 2330 may be split into two or more separate components, such as a north bridge and a south bridge, for example. In addition, in some embodiments some or all of the functionality of I/O interface 2330, such as an interface to system memory 2320, may be incorporated directly into processor 2310.

Network interface 2340 may be configured to allow data to be exchanged between computer system 2300 and other devices attached to a network, such as other computer systems, or between nodes of computer system 2300. In various embodiments, network interface 2340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2350 may, in some embodiments, include one or more display terminals, keyboards, keypads, touchpads, scanning devices, voice or optical recognition devices, or any other devices suitable for entering or retrieving data by one or more computer system 2300. Multiple input/output devices 2350 may be present in computer system 2300 or may be distributed on various nodes of computer system 2300. In some embodiments, similar input/output devices may be separate from computer system 2300 and may interact with one or more nodes of computer system 2300 through a wired or wireless connection, such as over network interface 2340.

As shown in FIG. 23, memory 2320 may include program instructions 2325, configured to implement embodiments of a stereo aware image editing module as described herein, and data storage 2335, comprising various data accessible by program instructions 2325. In one embodiment, program instructions 2325 may include software elements of embodiments of a stereo aware image editing module as illustrated in the above Figures. Data storage 2335 may include data that may be used in embodiments. In other embodiments, other or different software elements and data may be included.

Those skilled in the art will appreciate that computer system 2300 is merely illustrative and is not intended to limit the scope of a stereo-aware image editing module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2300 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    causing one or more processors to perform:
        building a destination three-dimensional model of a stereo scene from one or more input images;
        computing camera parameters for the one or more input images;
        modifying the destination three-dimensional model, such that the modifying the destination three-dimensional model includes:
            building a source three-dimensional model from the input images to use for stereo aware copy-and-paste such that sections are copied from the source three-dimensional model and pasted on to the destination three-dimensional model;
            modifying one or more of the input images; and
            applying results of the modifying one or more of the input images to corresponding model vertices; and
        re-rendering the scene from the camera parameters to produce an edited stereo pair which is consistent with the destination three-dimensional model.

2. The method of claim 1, wherein the model comprises a plurality of triangle meshes composed of vertices, connected by a set of edges, representing items in the scene.

3. The method of claim 1, wherein the building the destination three-dimensional model further comprises
    minimizing a sum of squared differences between a rendered left image and an input left image, and
    minimizing a sum of squared differences between a rendered right image and a right input image.

4. The method of claim 1, wherein the building the destination three-dimensional model further comprises building an initial destination three-dimensional model from a stereo matching algorithm for the vertices and a structure from motion algorithm for the camera parameters and iteratively estimating the vertices, colors and camera parameters.

5. The method of claim 1, wherein the building the destination three-dimensional model further comprises:
    moving points along a ray to a left camera center in order to improve the fidelity of a right image; and
    moving points along a ray to a right camera center in order to improve the fidelity of a left image.

6. The method of claim 1, wherein the building the destination three-dimensional model further comprises numerically estimating a derivative of a fidelity term.

7. The method of claim 1, wherein the modifying the destination three-dimensional model comprises editing directly onto the one or more images without providing direct user interaction with the three dimensional model.

8. A system, comprising:
at least one processor; and
a memory comprising program instructions, wherein the program instructions are executable by the at least one processor to:
build a destination three-dimensional model of a stereo scene from one or more input images;
compute camera parameters for the one or more input images;
modify the destination three-dimensional model, such that the instructions executable by the at least one processor to modify the destination three-dimensional model include instructions executable by the at least one processor to:
build a source three-dimensional model from the input images to use for stereo aware copy-and-paste such that sections are copied from the source three-dimensional model and pasted on to the destination three-dimensional model;
modify one or more of the input images; and
apply results of the instructions executable by the one or more processors to modify the one or more of the input images to corresponding model vertices; and
re-render the scene from the camera parameters to produce an edited stereo pair which is consistent with the destination three-dimensional model.

9. The system of claim 8, wherein the model comprises a plurality of triangle meshes composed of vertices representing items in the scene connected by a set of edges.

10. The system of claim 8, wherein the program instructions are executable by the at least one processor to build the destination three-dimensional model further comprise:
program instructions executable by the at least one processor to minimize a sum of absolute differences between a rendered left image and a input left image, and
program instructions executable by the at least one processor to minimize a sum of absolute differences between a rendered right image and an input right image.

11. The system of claim 8, wherein the program instructions executable by the at least one processor to build the destination three-dimensional model further comprise program instructions executable by the at least one processor to build an initial three-dimensional model from a stereo matching algorithm for the vertices and a structure from motion algorithm for the camera parameters and iteratively estimating the vertices, colors and camera parameters.

12. The system of claim 8, wherein the program instructions executable by the at least one processor to build the destination three-dimensional model further comprise program instructions executable by the at least one processor to move points along a ray to the left camera center in order to improve the fidelity of the right image and program instructions executable by the at least one processor to move the points along a ray to the right camera center in order to improve the fidelity of the left image.

13. The system of claim 8, wherein the program instructions executable by the at least one processor to build the destination three-dimensional model further comprise program instructions executable by the at least one processor to numerically estimate a derivative of a fidelity term.

14. The system of claim 8, wherein the program instructions executable by the at least one processor to modify the destination three-dimensional model comprise program instructions executable by the at least one processor to edit directly onto the one or more images without providing direct user interaction with the three dimensional model.

15. A non-transitory computer-readable storage medium storing program instructions, such that the program instructions are computer-executable to implement:
building a destination three-dimensional model of a stereo scene from one or more input images;
computing camera parameters for the one or more input images;
modifying the destination three-dimensional model, wherein the modifying the three-dimensional model includes:
building a source three-dimensional model from the input images to use for stereo aware copy-and-paste such that sections are copied from the source three-dimensional model and pasted on to the destination three-dimensional model;
modifying one or more of the input images; and
applying results of the modifying one or more of the input images to corresponding model vertices; and
re-rendering the scene from the camera parameters to produce an edited stereo pair which is consistent with the destination three-dimensional model.

16. The non-transitory computer-readable storage medium of claim 15, wherein the model comprises a plurality of triangle meshes composed of vertices representing items in the scene connected by a set of edges.

17. The non-transitory computer-readable storage medium of claim 15, wherein the program instructions computer-executable to implement the building the destination three-dimensional model further comprise:
program instructions computer-executable to implement minimizing a measure of differences between a rendered left image and an input left image, and
program instructions computer-executable to implement minimizing a measure of differences between a rendered right image and an input right image.

18. The non-transitory computer-readable storage medium of claim 15, wherein the program instructions computer-executable to implement the building the destination three-dimensional model further comprise program instructions computer-executable to implement building an initial destination three-dimensional model from a stereo matching algorithm for the vertices and a structure from motion algorithm for the camera parameters and iteratively estimating the vertices, colors and camera parameters.

19. The non-transitory computer-readable storage medium of claim 15, wherein the program instructions computer-executable to implement the building the destination three-dimensional model further comprise:
program instructions computer-executable to implement moving points along a ray to a left camera center in order to improve the fidelity of a right image; and
program instructions computer-executable to implement moving points along a ray to a right camera center in order to improve the fidelity of a left image.

20. The non-transitory computer-readable storage medium of claim 15, wherein the program instructions computer-executable to implement the building the destination three-dimensional model further comprise program instructions computer-executable to implement numerically estimating a derivative of a fidelity term.

* * * * *